(12) United States Patent
Aoki et al.

(10) Patent No.: US 12,149,871 B2
(45) Date of Patent: Nov. 19, 2024

(54) PROJECTOR AND CONTROL METHOD FOR PROJECTOR

(71) Applicant: SEIKO EPSON CORPORATION, Tokyo (JP)

(72) Inventors: Toru Aoki, Shiojiri (JP); Hiroyuki Hosaka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/372,404

(22) Filed: Sep. 25, 2023

(65) Prior Publication Data

US 2024/0015271 A1 Jan. 11, 2024

Related U.S. Application Data

(63) Continuation of application No. 17/848,532, filed on Jun. 24, 2022, now abandoned.

(30) Foreign Application Priority Data

Jun. 25, 2021 (JP) .................................. 2021-105466

(51) Int. Cl.
*H04N 9/31* (2006.01)
*G09G 3/00* (2006.01)
*G09G 5/391* (2006.01)

(52) U.S. Cl.
CPC .......... *H04N 9/3185* (2013.01); *G09G 3/007* (2013.01); *G09G 5/391* (2013.01); *H04N 9/3188* (2013.01);
(Continued)

(58) Field of Classification Search
CPC .. H04N 9/3185; H04N 9/3188; H04N 9/3105; G09G 3/007; G09G 3/2011;
(Continued)

(56) References Cited

U.S. PATENT DOCUMENTS

2011/0234650 A1* 9/2011 Watanabe .............. G09G 5/399
345/690
2016/0366383 A1* 12/2016 Nishimori ............ H04N 9/3188
2017/0099484 A1* 4/2017 Mashitani ............ H04N 13/363

FOREIGN PATENT DOCUMENTS

JP 2011-203460 A 10/2011
JP 2019-195130 A 11/2019

OTHER PUBLICATIONS

Jan. 27, 2023 Office Action issued in U.S. Appl. No. 17/848,532.

* cited by examiner

*Primary Examiner* — Brent D Castiaux
(74) *Attorney, Agent, or Firm* — Oliff PLC

(57) ABSTRACT

A projector including an electro-optical panel in which a plurality of pixels are arrayed, an optical path shifting element configured to change an optical path of light emitted from the plurality of pixels, and a control circuit configured to control a state of the optical path shifting element such that light emitted from a predetermined pixel among the plurality of pixels reaches a first position on a display screen in the first unit period, control a state of the optical path shifting element such that light emitted from the predetermined pixel reaches a second position on the display screen in the second unit period, and control a state of the optical path shifting element in a transition period in which a unit period transitions from the first unit period to the second unit period based on a type of image indicated by an input image signal.

11 Claims, 20 Drawing Sheets

(52) U.S. Cl.
CPC . *G09G 2320/0285* (2013.01); *G09G 2340/16* (2013.01); *G09G 2360/18* (2013.01)

(58) Field of Classification Search
CPC ................. G09G 3/3614; G09G 5/391; G09G 2320/0285; G09G 2320/0252; G09G 2340/16; G09G 2360/18; G02B 5/04; G02B 5/08
See application file for complete search history.

[DISPLAY PIXEL OF VIDEO DATA]

| A1 | B1 | A2 | B2 | A3 | B3 |
|----|----|----|----|----|----|
| D1 | C1 | D2 | C2 | D3 | C3 |
| A4 | B4 | A5 | B5 | A6 | B6 |
| D4 | C4 | D5 | C5 | D6 | C6 |
| A7 | B7 | A8 | B8 | A9 | B9 |
| D7 | C7 | D8 | C8 | D9 | C9 |

[PANEL PIXEL]

| Pa1 | Pa2 | Pa3 |
|-----|-----|-----|
| Pb1 | Pb2 | Pb3 |
| Pc1 | Pc2 | Pc3 |

FIG. 5

• ODD-NUMBERED FRAME OF VIDEO

• EVEN-NUMBERED FRAME OF VIDEO

• DISPLAY IN METHOD OF RELATED ART

[VERTICAL LINE]   [HORIZONTAL LINE]                [DIAGONAL LINE]

• DISPLAY ACCORDING TO EMBODIMENT

[VERTICAL LINE]   [HORIZONTAL LINE]                [DIAGONAL LINE]

PROJECTOR AND CONTROL METHOD FOR PROJECTOR

This application is a continuation of U.S. application Ser. No. 17/848,532, filed Jun. 24, 2022. The present application is based on, and claims priority from JP Application Serial Number 2021-105466, filed Jun. 25, 2021, the disclosure of which is hereby incorporated by reference herein in its entirety.

BACKGROUND

1. Technical Field

The present disclosure relates to a projector and a control method for the projector.

2. Related Art

In the technical field of projectors, a pixel shift technology using an optical path shifting element that optically shifts a display position is known as a method of artfully increasing a resolution. In the pixel shift technology, one frame period corresponding to a single frame is divided into a plurality of unit periods, and the optical path shifting element is controlled such that the optical path shifting element is in a state differing in each of the unit periods. As a result, the display position of an image projected from the projector on the projection surface shifts in each unit period.

As a pixel shift technology, for example, JP-A-2011-203460 discloses a technique of controlling whether to move a position of an image of pixels on a projection surface over time depending on whether the image to be displayed is a still image or a moving image. In addition, JP-A-2019-195130 discloses a technique of controlling whether to move a projection position depending on whether a size of a pixel of a projected image has a value equal to or greater than a predetermined value.

In the pixel shift technology, it is desirable to instantaneously perform a state change of an optical path shifting element and switching of a projection image in each unit period. However, in reality, a certain amount of time is required for a state change of an optical path shifting element and switching of a projection image. Therefore, there is a time lag between the start and end timings of a state change of an optical path shifting element and the start and end timings of switching of a projection image. In this case, the image quality of the projection image deteriorates. Further, a time required for switching a projection image depends on, for example, a response speed of the liquid crystal panel of a projector.

However, images projected from a projector includes images with a grayscale value changing smoothly among pixels and images with clear boundaries between pixels. Thus, a projector that appropriately performs an image shift regardless of which of the two types of images is projected is required.

SUMMARY

A projector according to an aspect of the present disclosure includes an electro-optical panel in which a plurality of pixels that emit light based on an image signal are arrayed, an optical path shifting element that can change an optical path of light emitted from the plurality of pixels, an image processing circuit that supplies a first image signal based on an input image signal as the image signal to the electro-optical panel in a first unit period among a plurality of unit periods included in one frame period and supplies a second image signal based on the input image signal as the image signal to the electro-optical panel in a second unit period after the first unit period among the plurality of unit periods, and a control circuit that controls a state of the optical path shifting element such that light emitted from a predetermined pixel among the plurality of pixels reaches a first position on a display screen in the first unit period, controls a state of the optical path shifting element such that light emitted from the predetermined pixel reaches a second position on the display screen in the second unit period, and controls, based on a type of image indicated by the input image signal, a state of the optical path shifting element in a transition period in which a unit period transitions from the first unit period to the second unit period.

In addition, a control method for a projector according to an aspect of the present disclosure is a control method for a projector including an electro-optical panel in which a plurality of pixels that emit light based on an image signal are arrayed and an optical path shifting element that can change an optical path of light emitted from the plurality of pixels, the control method including supplying a first image signal based on an input image signal to the electro-optical panel as the image signal in a first unit period among a plurality of unit periods included in one frame period and supplying a second image signal based on the input image signal as the image signal to the electro-optical panel in a second unit period after the first unit period among the plurality of unit periods, and controlling a state of the optical path shifting element such that light emitted from a predetermined pixel among the plurality of pixels reaches a first position on a display screen in the first unit period, controlling a state of the optical path shifting element such that light emitted from the predetermined pixel reaches a second position on the display screen in the second unit period, and controlling, based on a type of image indicated by the input image signal, a state of the optical path shifting element in a transition period in which a unit period transitions from the first unit period to the second unit period.

BRIEF DESCRIPTION OF THE DRAWINGS

FIG. 5 is a diagram illustrating a relationship between display pixels, projection positions and the like in G according to the first embodiment.

DESCRIPTION OF EXEMPLARY EMBODIMENTS

A projector and a control method for the projector according to embodiments will be described below with reference to the accompanying drawings. Further, in each drawing, the size and scale of each unit are different from the actual size and scale thereof as appropriate. Moreover, the embodiments described below are suitable specific examples of the disclosure, and various technically preferable limitations are applied, but the scope of the disclosure is not limited to these modes unless the disclosure is specifically described in the following description as being limiting.

First Embodiment

Figure 1:
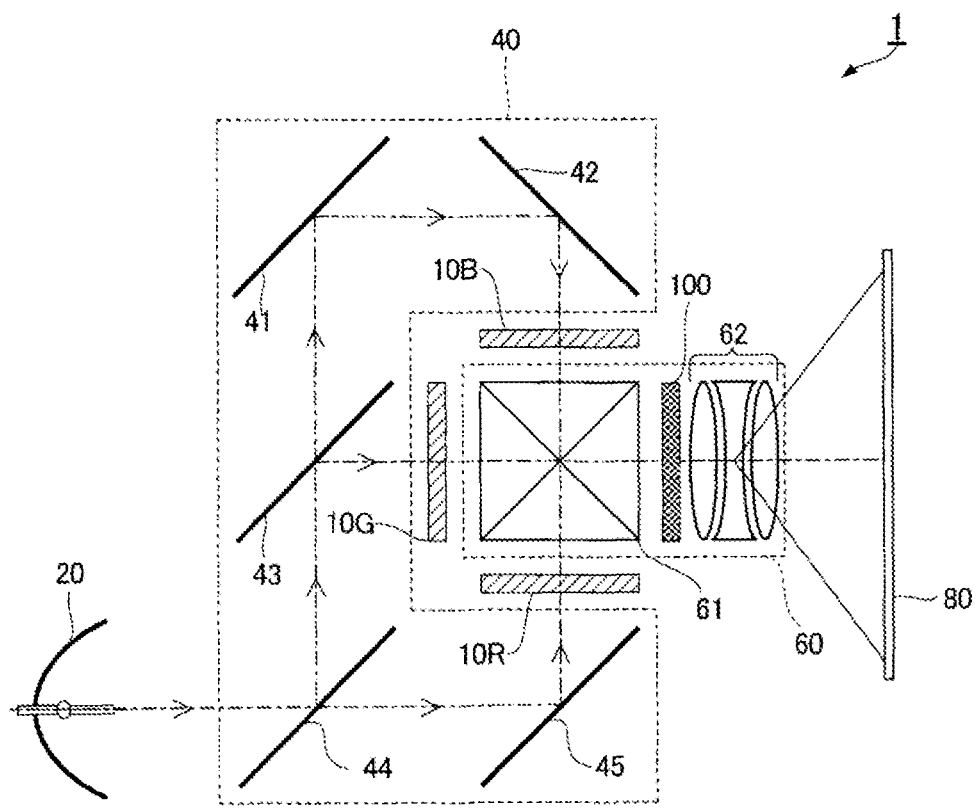
FIG. 1 is a descriptive diagram illustrating an example of a configuration of an optical system of a projector according to a first embodiment.

First, an example of a configuration of a projector 1 according to a first embodiment of the present disclosure will be described. FIG. 1 is a descriptive diagram illustrating an example of a configuration of the projector 1. The projector 1 employs overdrive processing and performs an optical pixel shift to be described below.

The projector 1 includes an illumination device 20, a separation optical system 40, three liquid crystal panels 10R, 10G, and 10B, and a projection optical system 60. Further, although details will be described in FIG. 6 below, the projector 1 includes an optical path shifting element 100 and functional blocks of a control system that controls the liquid crystal panels 10R, 10G, and 10B, and the like in addition to the elements illustrated in FIG. 1. Each of the liquid crystal panels 10R, 10G, and 10B is an example of an "electro-optical panel". Hereinafter, the liquid crystal panels 10R, 10G, and 10B may be collectively referred to as a liquid crystal panel 10.

The illumination device 20 has a white light source such as a halogen lamp, for example.

The separation optical system 40 includes three mirrors 41, 42, 45, and dichroic mirrors 43 and 44 inside. In addition, the separation optical system 40 separates white light that is visible light emitted from the illumination device 20 into light of the three primary colors of red, green, and blue. Hereinafter, red is referred to as "R", green is referred to as "G", and blue is referred to as "B".

For example, white light emitted from the illumination device 20 is separated into light components of the three primary colors of light in the wavelength range of R, light in the wavelength range of G, and light in the wavelength range of B by the mirrors 41, 42, and 45 and the dichroic mirrors 43 and 44 disposed inside the separation optical system 40. Then, the light in the wavelength range of R is guided to the liquid crystal panel 10R, the light in the wavelength range of G is guided to the liquid crystal panel 10G, and the light in the wavelength range of B is guided to the liquid crystal panel 10B.

Specifically, the dichroic mirror 44 transmits light in the wavelength range of R of white light and reflects light in the wavelength ranges of G and B. The dichroic mirror 43 transmits light in the wavelength ranges of B of the light in the wavelength range of G and B reflected by the dichroic mirror 44 and reflects light in the wavelength range of G.

Here, the liquid crystal panels 10R, 10G, and 10B are used as spatial optical modulation units, respectively. Each of the liquid crystal panels 10R, 10G, and 10B includes, for example, 800 data lines, 600 scanning lines, and pixels arranged in a matrix shape in which 800 pixels in the horizontal direction and 600 pixels in the vertical direction are arrayed. In addition, in each pixel, the polarization state of transmitted light, which is emitted light of incident light, is controlled according to the grayscale. Further, the numbers of scanning lines, data lines, and pixels of the liquid crystal panels 10R, 10G, and 10B described above are an example, and are not limited to the above example.

The liquid crystal panels 10R, 10G, and 10B are provided with pixel electrodes each having a substantially square shape corresponding to the intersections of the scanning lines and the data lines, and with counter electrodes facing the pixel electrodes that are the same for each of the pixels. In addition, VA liquid crystals are provided between the pixel electrodes and the counter electrodes.

When a certain scanning line is selected in such a configuration, the data line intersecting the scanning line applies a voltage to the pixel electrode at the intersection of the scanning line and the data line. Even when the selection of the scanning line is canceled, the applied voltage is retained by the capacitor between the pixel electrode and the counter electrode facing the pixel electrode.

The projection optical system 60 includes a dichroic prism 61, a projection lens system. 62, and the optical path shifting element 100. Light modulated by each of the liquid crystal panels 10R, 10G, and 10B is incident on the dichroic prism 61 from three directions. While the dichroic prism 61 refracts light in the wavelength range of R and light in the wavelength range of B at 90 degrees, light in the wavelength range of G travels straight therethrough. As a result, the images of each of the primary colors of R, G, and B are combined.

Light emitted from the dichroic prism 61 passes through the optical path shifting element 100 and reaches the projection lens system 62. For example, the optical path shifting element 100 is disposed between the dichroic prism 61 and the projection lens system 62.

The projection lens system 62 causes the light emitted from the optical path shifting element 100, specifically, the combined image to expand and to be projected on a projection surface 80 such as a screen. Further, the dichroic mirrors 43 and 44 cause light beams corresponding to the primary colors of R, G, and B corresponding to each of the dichroic mirrors to be incident on the liquid crystal panels 10R, 10G, and 10B. For this reason, it is not necessary to provide a color filter in the liquid crystal panels 10R, 10G and 10B.

In addition, while an image transmitted by each of the liquid crystal panels 10R and 10B is reflected by the dichroic prism 61 and projected on the projection surface 80, an image transmitted by the liquid crystal panel 10G travels straight through the dichroic prism 61 and is projected thereon. Thus, the image formed by the liquid crystal panels 10R and 10B and the image formed by the liquid crystal panel 10G are laterally inverted.

Figure 2:
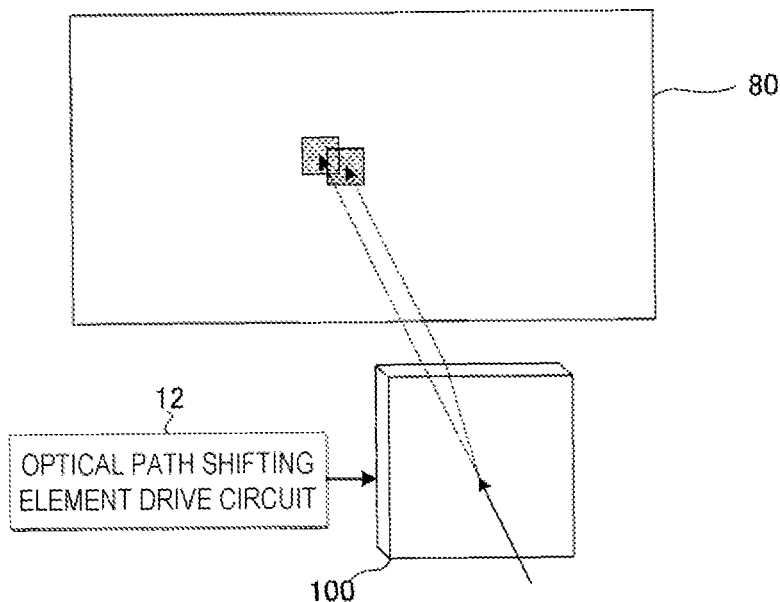
FIG. 2 is a diagram for describing an operation of an optical path shifting element according to the first embodiment.

FIG. 2 is a diagram for describing an operation of the optical path shifting element 100. The optical path shifting element 100 is driven based on an output signal of an optical path shifting element drive circuit 12, and causes the optical path of incident light to deviate to shift the position of the pixel displayed on the projection surface 80. This will be referred to as a pixel shift in the following description. When the optical path of light emitted from the dichroic prism 61 is shifted by the optical path shifting element 100, the position of a displayed pixel is deviated, i.e., is shifted, on the projection surface 80.

Specifically, when a one-frame image is displayed due to a high-resolution image signal VIDH to be described later, a period in which the one frame is displayed is divided into four subframes, and the projection position is shifted for each subframe. Due to such a shift, one panel pixel is visually recognized as if the four display pixels were displayed in one frame, i.e. four subframes.

Figures 3, 4:
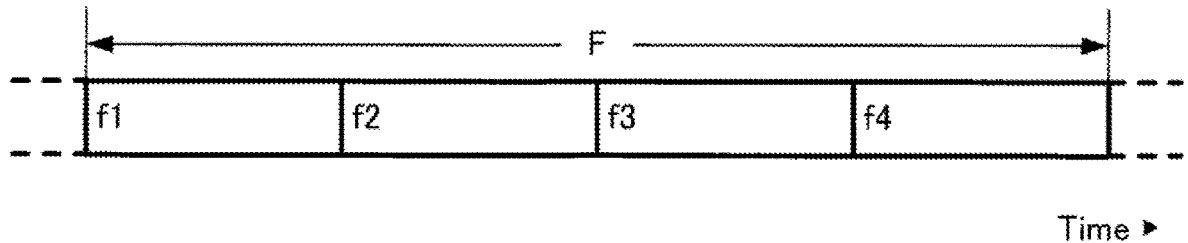
FIG. 3 is a diagram illustrating a relationship between a frame and subframes according to the first embodiment.
FIG. 4 is a diagram illustrating a relationship between display pixels and panel pixels according to the first embodiment.

FIG. 3 is a diagram for describing a relationship between a frame and subframes in the embodiment. As illustrated in this drawing, the four subframes created by dividing one frame F are denoted by reference symbols f1, f2, f3, and f4, respectively, in order of time in the embodiment.

Next, a relationship between display pixels with grayscale levels specified by the high-resolution image signal VIDH, panel pixels of the liquid crystal panel 10, and projection positions by the optical path shifting element 100 will be described. Further, although the optical path shifting element 100 causes a projection direction from the dichroic prism 61 to be shifted as described above, an amount of shift is converted into a size of a projection pixel (panel pixel) on the projection surface 80 for convenience.

The left column in FIG. 4 is a diagram illustrating only some extracted pixels of display pixels indicated by the high-resolution image signal VIDH. Additionally, the right column in FIG. 4 is a diagram illustrating an extracted array corresponding to the array of the display pixels in the left column among panel pixels of the liquid crystal panel 10.

In order to distinguish pixels in the array of the display pixels indicated by the high-resolution image signal VIDH in FIG. 4, reference symbols A1, B1, A2, B2, A3, and B3 are given from the left side in the first row for convenience. Also, D1, C1, D2, C2, D3, and C3 are given from the left side in the second row. Also, A4, B4, A5, B5, A6, and B6 are given from the left side in the third row. Also, D4, C4, D5, C5, D6, and C6 are given from the left side in the fourth row. Also, A7, B7, A8, B8, A9, and B9 are given from the left side in the fifth row. Also, D7, C7, D8, C8, D9, and C9 are given from the left side in the sixth row.

In the array of the panel pixels in FIG. 4, reference symbols Pa1 to Pa3 are given in the first row, Pb1 to Pb3 are given in the second row, and Pc1 to Pc3 are given in the third row for convenience in order to distinguish the pixels.

FIG. 4 illustrates that a total of four display pixels of 2×2 indicated in a thick line frame in the array of the display pixels of the video data is represented in one panel pixel. For example, the four display pixels A1, B1, C1, and D1 are represented in the one panel pixel Pa1. In addition, for example, the four display pixels A2, B2, C2, and D2 are represented in the one panel pixel Pa2.

Figure 5:
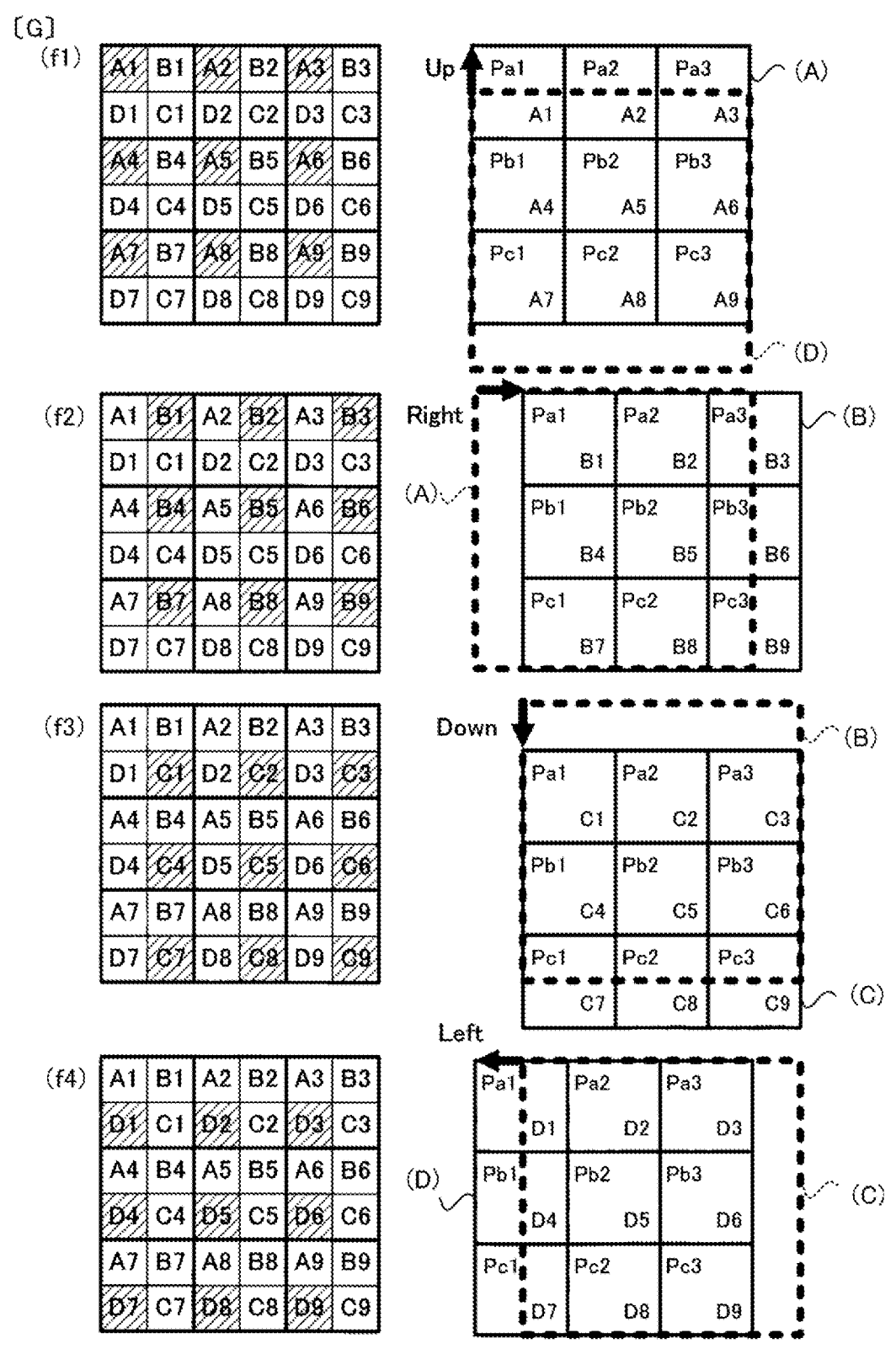

FIG. 5 is a diagram illustrating what projection positions of the display pixel of G of the high-resolution image signal VIDH are to be displayed by the panel pixel of the liquid crystal panel corresponding to G among the three colors of R, G, and B in the projector 1. Specifically, FIG. 5 is a diagram illustrating which display pixel among the display pixels of FIG. 4 is to be displayed by the panel pixel of FIG. 4 at a projection position in the subframes f1 to f4. The first stage in FIG. 5 indicates that, for example, the panel pixel Pa1 displays information corresponding to the display pixel A1 in the subframe f1 and projects the display pixel at a first projection position. The second stage in FIG. 5 indicates that, for example, the panel pixel Pa1 displays information corresponding to the display pixel B1 in the next subframe f2 and projects the display pixel at a second projection position. The third stage in FIG. 5 indicates that, for example, the panel pixel Pa1 displays information corresponding to the display pixel C1 in the next subframe f3 and projects the display pixel at a third projection position. The fourth stage in FIG. 5 indicates that, for example, the panel pixel Pa1 displays information corresponding to the display pixel D1 in the next subframe f4 and projects the display pixel at a fourth projection position. With this configuration, a high-resolution image can be displayed based on the display pixels A1, B1, C1, and D1 using the panel pixel Pa1 in the one frame F. In the embodiment, the display pixel A1, the display pixel B1, the display pixel C1, and the display pixel D1 correspond to a first display pixel, a second display pixel, a third display pixel, and a fourth display pixel, respectively. Further, the subframe f1, the subframe f2, the subframe f3, and the subframe f4 correspond to a "first unit period", a "second unit period", a "third unit period", and a "fourth unit period", respectively.

In order to describe a projection position by the optical path shifting element 100, the first projection position in the first subframe f1 of the frame F will be referred to as a "profection position (A)" for convenience. Further, the state of the optical path shifting element 100 when light emitted from the dichroic prism 61 reaches the projection position (A) will be referred to as a "state A".

In the subframe f1, one panel pixel represents the hatched display pixel located at the upper left corner among the 2×2 display pixels. Specifically, in the subframe f1, the panel pixels Pa1 to Pa3, Pb1 to Pb3, and Pc1 to Pc3 represent the display pixels A1, A2, A3, A4, A5, A6, A7, A8, and A9, respectively, in order. Here, for example, that the panel pixel Pa1 represents the display pixel A1 means that the panel pixel Pa1 of the liquid crystal panel 10G has a transmittance corresponding to the grayscale level of the G component in the display pixels A1 indicated by the high-resolution image signal VIDH.

In the next subframe f2, the optical path shifting element 100 is assumed to be at a "projection position (B)" that is the second projection position to which the projection position (A) of the subframe f1 indicated by dashed lines has shifted to the right of the drawing by 0.5 panel pixels. Further, the state of the optical path shifting element 100 when light emitted from the dichroic prism 61 reaches the projection position (B) will be referred to as a "state B".

In addition, in the subframe f2, one panel pixel represents the hatched display pixel located at the upper right corner among the 2×2 display pixels. Specifically, in the subframe f2, the panel pixels Pa1 to Pa3, Pb1 to Pb3, and Pc1 to Pc3 represent the display pixels B1, B2, B3, B4, B5, B6, B7, B8, and B9, respectively, in order.

In the subframe f3, the optical path shifting element 100 is assumed to be at a "projection position (C)" that is the third projection position to which the projection position (B) in the subframe f2 indicated by the dashed lines has shifted downward in the drawing by 0.5 panel pixels. Further, the state of the optical path shifting element 100 when light emitted from the dichroic prism 61 reaches the projection position (C) will be referred to as a "state C".

In addition, in the subframe f3, one panel pixel represents the hatched display pixel located at the lower right corner among the 2×2 display pixels. Specifically, in the subframe f3, the panel pixels Pa1 to Pa3, Pb1 to Pb3, and Pc1 to Pc3 represent the display pixels C1, C2, C3, C4, C5, C6, C7, C8, and C9, respectively, in order.

In addition, in the subframe f4, the optical path shifting element 100 is assumed to be at a "projection position (D)" that is the fourth projection position to which the projection position (C) in the subframe f3 indicated by the dashed lines has shifted to the left of the drawing by 0.5 panel pixels. Furthermore, the state of the optical path shifting element 100 when light emitted from the dichroic prism 61 reaches the projection position (D) will be referred to as a "state D".

In addition, in the subframe f4, one panel pixel represents the hatched display pixel located at the lower left corner among the 2×2 display pixels. Specifically, in the subframe f4, the panel pixels Pa1 to Pa3, Pb1 to Pb3, and Pc1 to Pc3 represent the display pixels D1, D2, D3, D4, D5, D6, D7, D8, and D9, respectively, in order.

After the subframe f4, the optical path shifting element 100 returns to the projection position (A) to which the projection position (D) of the subframe f4 indicated by dashed lines has shifted upward in the drawing by 0.5 panel pixels.

Figure 6:
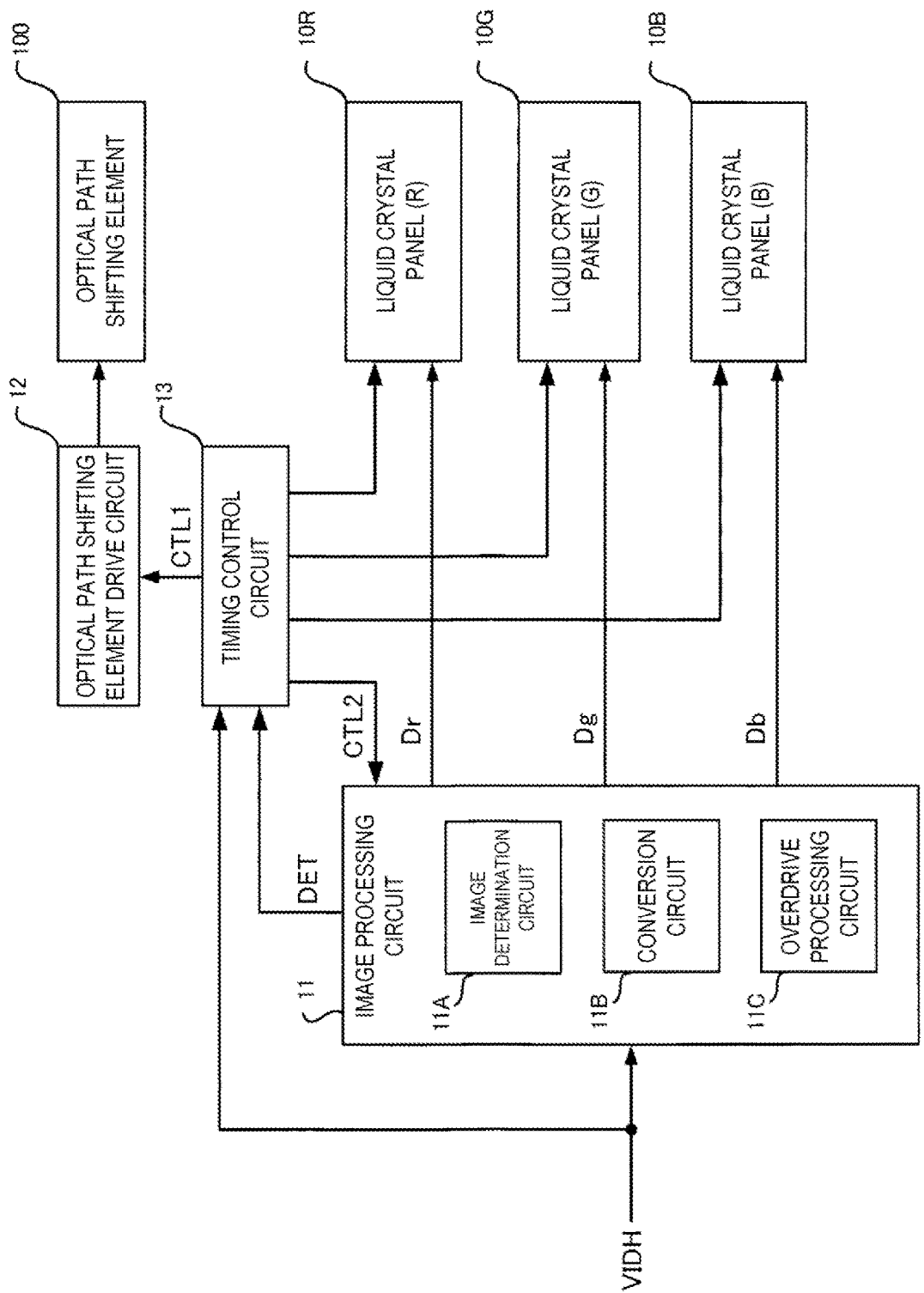
FIG. 6 is a block diagram illustrating an example of a configuration of a control system of a projector according to the first embodiment.

A configuration of the control system of the projector 1 will be described below. FIG. 6 is a block diagram illustrating a configuration example of the control system of the projector 1. The projector 1 includes the liquid crystal panels 10R, 10G, and 10B, an image processing circuit 11, the optical path shifting element drive circuit 12, a timing control circuit 13, and the optical path shifting element 100 as illustrated in the drawing.

The image processing circuit 11 includes an image determination circuit 11A that determines the type of an image with the high-resolution image signal VIDH as an input image signal. In addition, the image processing circuit 11 includes a conversion circuit 11B that converts the high-resolution image signal VIDH into a low-resolution image signal VIDL. Furthermore, the image processing circuit 11 includes an overdrive processing circuit 11C that generates output image signals Dr, Dg, and Db for driving the liquid crystal panels 10R, 10G, and 10B by performing overdrive processing on the low-resolution image signal VIDL.

The optical path shifting element drive circuit 12 drives the optical path shifting element 100 based on a control signal CTL1 supplied from the timing control circuit 13. The optical path shifting element drive circuit 12 is an example of a "control circuit". Further, the "control circuit" may include the timing control circuit 13 described below.

The timing control circuit 13 generates a clock signal and the like for supplying a data signal to each pixel electrode of the liquid crystal panels 10R, 10G, and 10B, and supplies the generated clock signal and the like to a data line drive circuit, which is not illustrated, of the liquid crystal panels 10R, 10G, and 10B. In addition, the timing control circuit 13 generates a control signal CTL1 for controlling the optical path shifting element drive circuit 12 and a control signal CTL2 for controlling the overdrive processing circuit 11C based on the input high-resolution image signal VIDH and a determination signal DET input from the image determination circuit 11A. Further, although the determination signal DET is a signal indicating the determination result of the type of the image indicated by the high-resolution image signal VIDH, details thereof will be described below. This configuration makes it possible to control the overdrive processing in synchronization with the state A to the state D of the optical path shifting element 100 described with reference to FIG. 5. Further, although the timing control circuit 13 performs various control operations based on the high-resolution image signal VIDH and the determination signal DET in this example, it may perform various control operations based on the low-resolution image signal VIDL and the determination signal DET output from the conversion circuit 11B. In addition, the timing control circuit 13 performs time division on one frame period corresponding to the one frame constituted by the state A to the state D into subframes f1 to f4 that are unit periods each corresponding to the states in FIG. 3. The optical path shifting element 100 is in the state A in the first unit period f1 as described above. Additionally, the optical path shifting element 100 is in the state B in the second unit period f2. Additionally, the optical path shifting element 100 is in the state C in the third unit period f3. Additionally, the optical path shifting element 100 is in the state D in the fourth unit period f4.

The control signal CTL1 is more particularly a signal for controlling the projection position of an image of light emitted from the optical path shifting element 100. Hereinafter, a projection position of an image of light emitted from the optical path shifting element 100 will be referred to as a "projection position by the optical path shifting element 100". The control signal CTL1 includes a control signal CTL1_X for causing a projection position to shift vertically and a control signal CTL1_Y for causing a projection position to shift horizontally on the projection surface 80 of the projector 1. Specifically, for a projection position by the optical path shifting element 100, an upward or downward direction is specified by a voltage of the control signal CTL1_Y, and a left or right direction is specified by a voltage of the control signal CTL1_X.

As will be more specifically described below, if the voltage of the control signal CTL1_X has a lowest value, the optical path shifting element 100 is at the projection position (A) or (D), and if the voltage thereof has a highest value, the optical path shifting element 100 is at the projection position (B) or (C) with reference to FIG. 5. If the voltage of the control signal CTL1_X has a value from the lowest value to the highest value, the optical path shifting element 100 is at a position between the projection position (A) or (D) and the projection position (B) or (C) according to the voltage.

In addition, if the voltage of the control signal CTL1_Y has a lowest value, the optical path shifting element 100 is at the projection position (A) or (B), and if the voltage thereof has a highest value, the optical path shifting element 100 is at the projection position (C) or (D). If the voltage of the control signal CTL1_Y has a value from the lowest value to the highest value, the optical path shifting element 100 is at a position between the projection position (A) or (B) and the projection position (C) or (D) according to the voltage.

Figure 7:
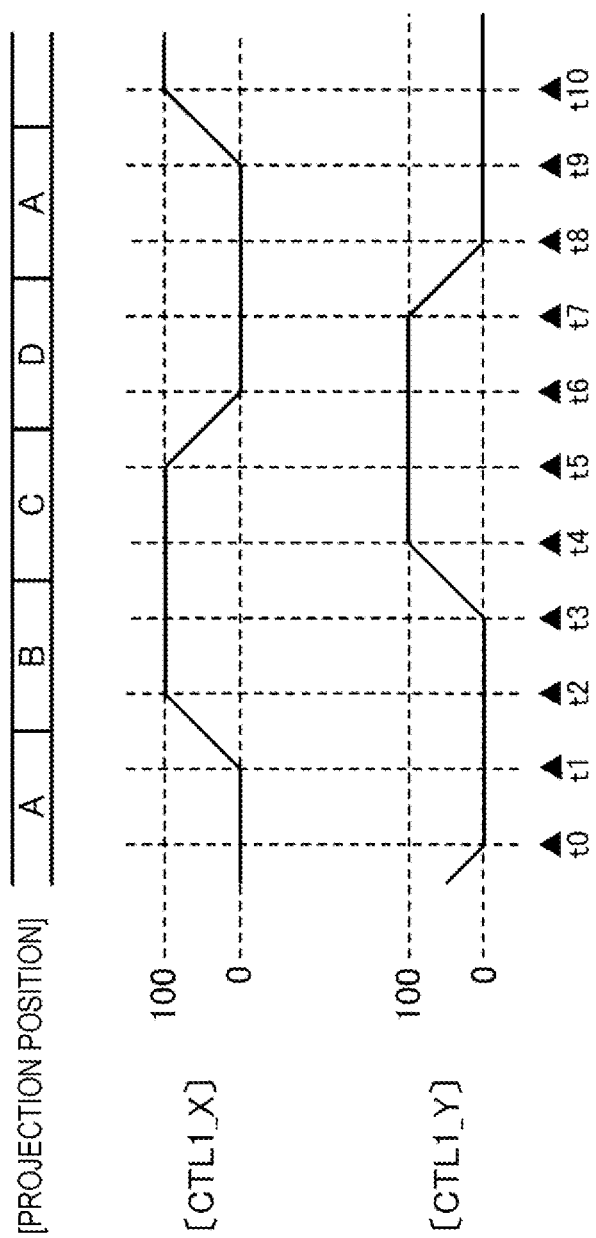
FIG. 7 is a descriptive diagram of a relationship between projection positions of an optical path shifting element and control signals over time according to a comparative example.

FIG. 7 is a diagram illustrating a relationship between the projection positions by the optical path shifting element 100 corresponding to FIG. 5 and the control signals CTL1_X and CTL1_Y over time that is a relationship over time as a comparative example. Further, FIG. 7 shows a highest value of CTL1_X and CTL1_Y at 100V and a lowest value thereof at 0V as an example. However, an aspect of the embodiment is not limited thereto.

Specifically, the voltage of the control signal CTL1_X is maintained at the lowest value in the period from a timing t0 to a timing t1. In addition, the voltage of the control signal CTL1_X increases from the lowest value to the highest value in the period from the timing t1 to a timing t2. Furthermore, the voltage of the control signal CTL1_X is maintained at the highest value in the period from the timing t2 to a timing t5. Furthermore, the voltage of the control signal CTL1_X decreases from the highest value to the lowest value in the period from the timing t5 to a timing t6. Furthermore, the voltage of the control signal CTL1_X is maintained at the lowest value in the period from the timing t6 to a timing t9. Furthermore, the voltage of the control signal CTL1_X increases from the lowest value to the highest value in the period from the timing t9 to a timing t10.

Furthermore, the voltage of the control signal CTL1_Y is maintained at the lowest value in the period from the timing t0 to the timing t3. Furthermore, the voltage of the control signal CTL1_Y increases from the lowest value to the highest value in the period from the timing t3 to the timing t4. Furthermore, the voltage of the control signal CTL1_Y is maintained at the highest value in the period from the timing t4 to the timing t7. Furthermore, the voltage of the control signal CTL1_Y decreases from the highest value to the lowest value in the period from the timing t7 to the timing t8. Furthermore, the voltage of the control signal CTL1_Y is maintained at the lowest value in the period from the timing t8 to the timing t10.

Thus, the state of the optical path shifting element 100 is maintained in the state A in the period from the timing t0 to the timing t1. Also at the timing t1, the state of the optical path shifting element 100 starts to transition from the state A to the state B. In addition, the state of the optical path shifting element 100 ends the transition to the state B at the timing t2. Furthermore, the state of the optical path shifting element 100 is maintained in the state B in the period from the timing t2 to the timing t3. Also at the timing t3, the state of the optical path shifting element 100 starts to transition from the state B to the state C. In addition, the state of the optical path shifting element 100 ends the transition to the state C at the timing t4. Furthermore, the state of the optical path shifting element 100 is maintained in the state C in the period from the timing t4 to the timing t5. Also at the timing t5, the state of the optical path shifting element 100 starts to transition from the state C to the state D. In addition, the state of the optical path shifting element 100 ends the transition to the state D at the timing t6. Furthermore, the state of the optical path shifting element 100 is maintained in the state D in the period from the timing t6 to the timing t7. Also at the timing t7, the state of the optical path shifting element 100 starts to transition from the state D to the state A. The state of the optical path shifting element 100 ends the transition to the state A at the timing t8. Furthermore, the state of the optical path shifting element 100 is maintained in the state A in the period from the timing t8 to the timing t9. Also at the timing t9, the state of the optical path shifting element 100 starts to transition from the state A to the state B. The state of the optical path shifting element 100 ends the transition to the state B at the timing t10.

Figure 8:
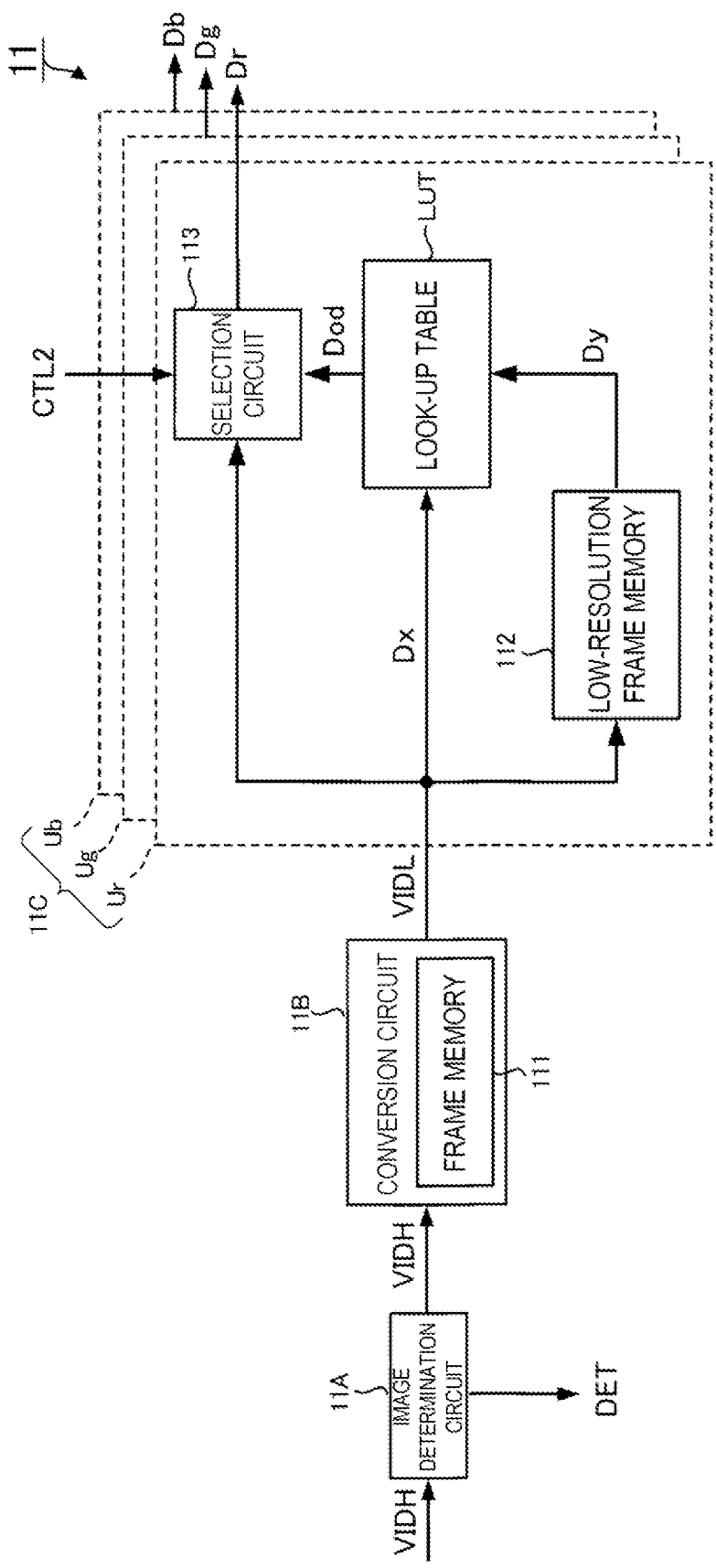
FIG. 8 is a block diagram illustrating an example of a configuration of an image processing circuit according to the first embodiment.

Next, a detailed configuration of the image processing circuit 11 will be described. FIG. 8 is a block diagram illustrating a configuration example of the image processing circuit 11.

The image determination circuit 11A determines the type of an image indicated by the high-resolution image signal VIDH based on the high-resolution image signal VIDH. Types of images correspond to, for example, an image with clear boundaries between pixels, and an image with unclear boundaries between pixels. An image with clear boundaries between pixels is an image that is to be expressed with the pixels separated from each other. In addition, an image with unclear boundaries between pixels is an image in which grayscale values change smoothly between pixels. It is assumed in the embodiment that an image with clear boundaries between pixels is a character drawing and an image with unclear boundaries between pixels is a natural image. However, an image with clear boundaries between pixels is not limited to a character drawing. Similarly, an image with unclear boundaries between pixels is not limited to a natural image.

Additionally, the image determination circuit 11A generates a determination signal DET indicating the determination result, and outputs the generated determination signal DET to the timing control circuit 13.

Although a method for determining the type of an image is not particularly limited, for example, the image determination circuit 11A may determine whether the high frequency component contained in one image indicated by the high-resolution image signal VIDH exceeds a threshold value, and generate the determination signal DET indicating the determination result. Specifically, when the high frequency component contained in one image exceeds the threshold value, the determination signal DET indicates that the image is an image with unclear boundaries between the pixels. On the other hand, when the high frequency component contained in one image does not exceed the threshold value, the determination signal DET indicates that the image is an image with clear boundaries between pixels.

Alternatively, the image determination circuit 11A calculates the horizontal difference value which is the absolute value of the difference in luminance between pixels adjacent to each other in the horizontal direction for each image of R, G, and B constituting the one image indicated by the high-resolution image signal VIDH as another method. Next, the image determination circuit 11A calculates the vertical difference value which is the absolute value of the difference in luminance between pixels adjacent to each other in the vertical direction for each image of R, G, and B. Next, the image determination circuit 11A calculates the total difference value by adding the sum of the horizontal difference values and the sum of the vertical difference values. Finally, the image determination circuit 11A may compare the total of the total difference values of each image of R, G, and B and a threshold value to generate the determination signal DET. Specifically, if the total of the total difference values of each image of R, G, and B exceeds the threshold value, the determination signal DET indicates that the image is an image with clear boundaries between pixels. On the other hand, if the total of the total difference values of each image of R, G, and B does not exceed the threshold value, the determination signal DET indicates that the image is an image with unclear boundaries between pixels.

Alternatively, as another method, when information indicating the type of the one image indicated by the high-resolution image signal VIDH is added to the high-resolution image signal VIDH, the image determination circuit 11A may generate the determination signal DET based on the added information.

As described above, the determination signal DET is output to the timing control circuit 13. The timing control circuit 13 generates a control signal CTL1 for controlling the optical path shifting element drive circuit 12 based on the high-resolution image signal VIDH and the determination signal DET acquired from the image determination circuit 11A.

Before describing the conversion circuit 11B and the like, the relationship between a determination result by the image determination circuit 11A and a projection position by the optical path shifting element 100 will be described with reference to FIGS. 9A and 9B.

Figure 9A:
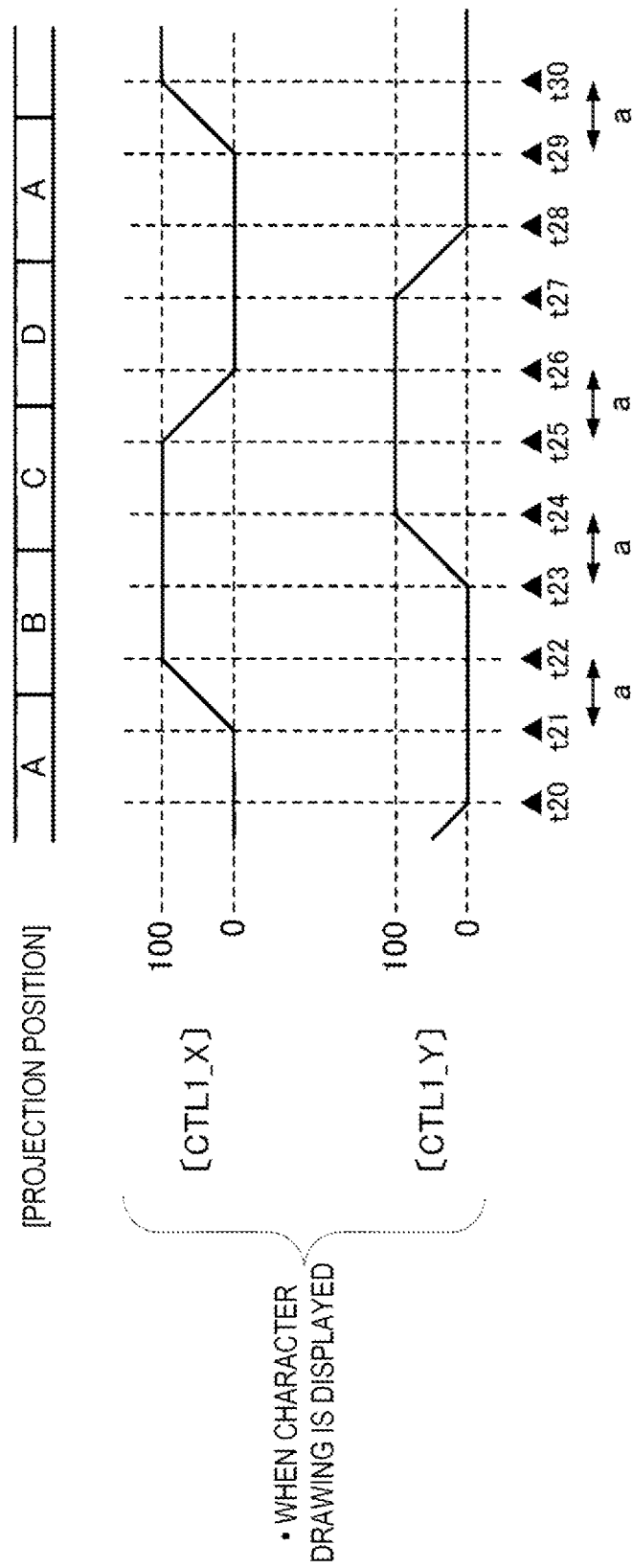
FIG. 9A is a descriptive diagram of a relationship between projection positions of the optical path shifting element and control signals over time according to the first embodiment.
Figure 9B:
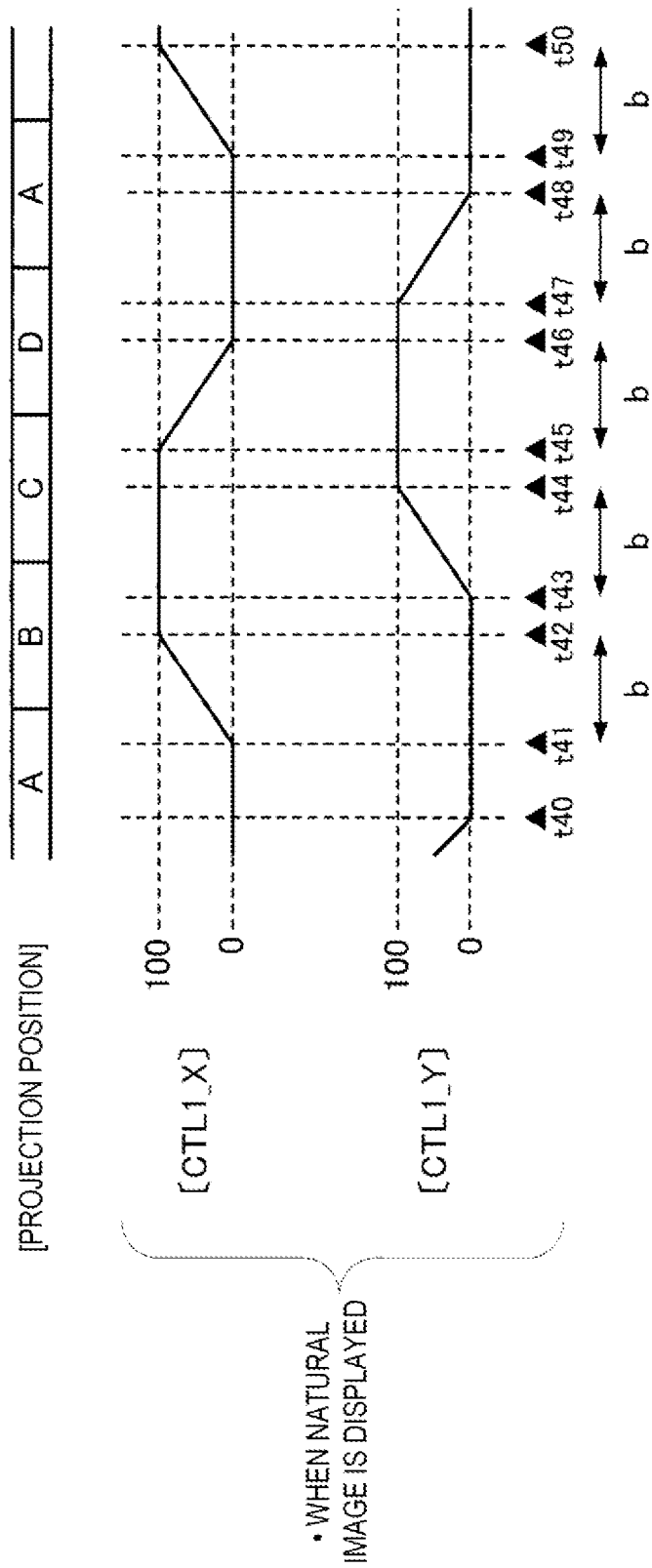
FIG. 9B is a descriptive diagram of a relationship between projection positions of the optical path shifting element and control signals over time according to the first embodiment.

FIGS. 9A and 9B are diagrams illustrating an example of the relationship between a projection position by the optical path shifting element 100 and the control signals CTL1_X and CTL1_Y over time for each determination result by the image determination circuit 11A according to the embodiment. Further, FIGS. 9A and 9B shows a highest value of CTL1_X and CTL1_Y at 100V, and a lowest value thereof at 0V as an example. However, an aspect of the embodiment is not limited thereto. In addition, FIG. 9A illustrates a case where the image determination circuit 11A has determined that an image indicated by the high-resolution image signal VIDH is an image to be expressed with pixels separated from each other. On the other hand, FIG. 9B illustrates a case where the image determination circuit 11A has determined that the image is an image indicated by the high-resolution image signal VIDH with grayscale values smoothly changing between pixels. However, an embodiment of the present disclosure is not limited thereto. Additionally, although FIG. 9A illustrates a case of a character drawing as a former example, and FIG. 9B illustrates a case of a natural image as a latter example, an embodiment of the present disclosure is not limited thereto. Further, as will be described in embodiments from a second embodiment, the case of a character drawing will be described as a former example, and the case of a natural image will be described as a latter example.

When the determination result by the image determination circuit 11A is a character drawing, the voltage of the control signal CTL1_X is maintained at the lowest value in the period from a timing t20 to a timing t21. Furthermore, the voltage of the control signal CTL1_X increases from the lowest value to the highest value in the period from the timing t21 to a timing t22. Furthermore, the voltage of the control signal CTL1_X is maintained at the highest value in the period from the timing t22 to a timing t25. Furthermore, the voltage of the control signal CTL1_X decreases from the highest value to the lowest value in the period from the timing t25 to a timing t26. Furthermore, the voltage of the control signal CTL1_X is maintained at the lowest value in the period from the timing t26 to a timing t29. Furthermore, the voltage of the control signal CTL1_X increases from the lowest value to the highest value in the period from the timing t29 to a timing t30.

Furthermore, the voltage of the control signal CTL1_Y is maintained at the lowest value in the period from the timing t20 to a timing t23. Furthermore, the voltage of the control signal CTL1_Y increases from the lowest value to the highest value in the period from the timing t23 to a timing t24. Furthermore, the voltage of the control signal CTL1_Y is maintained at the highest value in the period from the timing t24 to a timing t27. Furthermore, the voltage of the control signal CTL1_Y decreases from the highest value to the lowest value in the period from the timing t27 to a timing t28. Furthermore, the voltage of the control signal CTL1_Y is maintained at the lowest value in the period from the timing t28 to the timing t30.

Thus, the state of the optical path shifting element 100 is maintained in the state A in the period from the timing t20 to the timing t21. Also at the timing t21, the state of the optical path shifting element 100 starts to transition from the state A to the state B. In addition, the state of the optical path shifting element 100 ends the transition to the state B at the timing t22. Furthermore, the state of the optical path shifting element 100 is maintained in the state B in the period from the timing t22 to the timing t23. Also at the timing t23, the state of the optical path shifting element 100 starts to transition from the state B to the state C. In addition, the state of the optical path shifting element 100 ends the transition to the state C at the timing t24. Furthermore, the state of the optical path shifting element 100 is maintained in the state C in the period from the timing t24 to the timing t25. Also at the timing t25, the state of the optical path shifting element 100 starts to transition from the state C to the state D. In addition, the state of the optical path shifting element 100 ends the transition to the state D at the timing t26. Furthermore, the state of the optical path shifting element 100 is maintained in the state D in the period from the timing t26 to the timing t27. Also at the timing t27, the state of the optical path shifting element 100 starts to transition from the state D to the state A. The state of the optical path shifting element 100 ends the transition to the state A at the timing t28. Furthermore, the state of the optical path shifting element 100 is maintained in the state A in the period from the timing t28 to the timing t29. Also at the timing t29, the state of the optical path shifting element 100 starts to transition from the state A to the state B. The state of the optical path shifting element 100 ends the transition to the state B at the timing t30.

On the other hand, when the determination result by the image determination circuit 11A is a natural image, the voltage of the control signal CTL1_X is maintained at the lowest value in a period from a timing t40 to a timing t41. In addition, the voltage of the control signal CTL1_X increases from the lowest value to the highest value in the period from the timing t41 to a timing t42. Furthermore, the voltage of the control signal CTL1_X is maintained at the highest value in the period from the timing t42 to a timing t45. Furthermore, the voltage of the control signal CTL1_X decreases from the highest value to the lowest value in the period from the timing t45 to a timing t46. Furthermore, the voltage of the control signal CTL1_X is maintained at the lowest value in the period from the timing t46 to a timing t49. Furthermore, the voltage of the control signal CTL1_X increases from the lowest value to the highest value in the period from the timing t49 to a timing t50.

Furthermore, the voltage of the control signal CTL1_Y is maintained at the lowest value in the period from the timing t40 to a timing t43. Furthermore, the voltage of the control signal CTL1_Y increases from the lowest value to the highest value in the period from the timing t43 to a timing t44. Furthermore, the voltage of the control signal CTL1_Y is maintained at the highest value in the period from the timing t44 to a timing t47. Furthermore, the voltage of the control signal CTL1_Y decreases from the highest value to the lowest value in the period from the timing t47 to a timing t48. Furthermore, the voltage of the control signal CTL1_Y is maintained at the lowest value in the period from the timing t48 to the timing t50.

Thus, the state of the optical path shifting element 100 is maintained in the state A in the period from the timing t40 to the timing t41. Also at the timing t41, the state of the optical path shifting element 100 starts to transition from the state A to the state B. In addition, the state of the optical path shifting element 100 ends the transition to the state B at the timing t42. Furthermore, the state of the optical path shifting element 100 is maintained in the state B in the period from the timing t42 to the timing t43. Also at the timing t43, the state of the optical path shifting element 100 starts to transition from the state B to the state C. In addition, the state of the optical path shifting element 100 ends the transition to the state C at the timing t44. Furthermore, the state of the optical path shifting element 100 is maintained in the state C in the period from the timing t44 to the timing t45. Also at the timing t45, the state of the optical path shifting element 100 starts to transition from the state C to the state D. In addition, the state of the optical path shifting element 100 ends the transition to the state D at the timing t46. Furthermore, the state of the optical path shifting element 100 is maintained in the state D in the period from the timing t46 to the timing t47. Also at the timing t47, the state of the optical path shifting element 100 starts to transition from the state D to the state A. The state of the optical path shifting element 100 ends the transition to the state A at the timing t48. Furthermore, the state of the optical path shifting element 100 is maintained in the state A in the period from the timing t48 to the timing t49. Also at the timing t49, the state of the optical path shifting element 100 starts to transition from the state A to the state B. The state of the optical path shifting element 100 ends the transition to the state B at the timing t50.

As described above, the optical path shifting element 100 transitions from the state A to the state D via the state B and the state C, similarly to the comparative example described in FIG. 7 described above.

The periods in which pixels shift, that is, the periods in the transition state, are the period from the timing t21 to the timing t22, the period from the timing t23 to the timing t24, the period from the timing t25 to the timing t26, the period from the timing t27 to the timing t28, and the period from the timing t29 to the timing t30 when the determination result by the image determination circuit 11A is a character drawing. All of these periods are assumed to have an equal length that is a value "a". On the other hand, when the determination result by the image determination circuit 11A is a natural image, the periods in which pixel shift, that is, the period in the transition state, are the period from the timing t41 to the timing t42, the period from the timing t43 to the timing t44, the period from the timing t45 to the timing t46, the period from the timing t47 to the timing t48, and the period from the timing t49 to timing t50. All of these periods are assumed to have an equal length that is a value "b". Here, when the values a and b are compared, a is smaller than b. That is, when the type of the projected image is a natural image, the optical path shifting element 100 is controlled such that the state of the optical path shifting element 100 changes gently compared to when the projected image is a character drawing. For this reason, when the type of the projected image is a natural image, the projection position by the optical path shifting element 100 is slowly changed compared to when the projected image is a character drawing. Due to the slow change in the projection position by the optical path shifting element 100, the expression near the boundaries included in the projected image changes gently. Conversely, when the type of a projected image is a character drawing, the optical path shifting element 100 is controlled such that the state of the optical path shifting element 100 changes quickly, compared to when the projected image is a natural image. For this reason, when the type of the projected image is a character image, the projection position by the optical path shifting element 100 is quickly changed compared to when the projected image is a natural image. Due to the quick change in the projection position by the optical path shifting element 100, the expression near the boundaries included in the projected image suddenly changes. Due to this configuration, a degree of separation between pixels can be switched based on the type of an image displayed by the projector 1 in the embodiment.

Further, although the example in which the optical path shifting element drive circuit 12 controls a speed of change when changing a state of the optical path shifting element 100 has been introduced in FIGS. 9A and 9B, the optical path shifting element drive circuit 12 may control an amount of change, or may control both conditions.

The description will now return to FIG. 8. The conversion circuit 11B converts the high-resolution image signal VIDH into a low-resolution image signal VIDL. Further, as an example, the high-resolution image signal VIDH is an image signal indicating an image having 1600 horizontal pixels and 1200 vertical pixels. In addition, as an example, the low-resolution image signal VIDL is an image signal indicating an image having 800 horizontal pixels and 600 vertical pixels. The conversion circuit 11B includes a frame memory 111 capable of storing the high-resolution image signal VIDH in one screen, and generates a low-resolution image signal VIDL using the frame memory 111. The high-resolution image signal VIDH and the low-resolution image signal VIDL are each made from signals of R, G, and B.

In the following description, low-resolution image signals VIDL each corresponding to the state A, state B, state C, and state D may be referred to image signals Va, Vb, Vc, and Vd, respectively.

The overdrive processing circuit 11C illustrated in FIG. 8 includes a processing unit Ur that processes the low-resolution image signal VIDL of R, a processing unit Ug that processes the low-resolution image signal VIDL of G, and a processing unit Ub that processes the low-resolution image signal VIDL of B. Although the processing unit Ur will be described below, the processing units Ug and Ub are configured similarly to the processing unit Ur.

The processing unit Ur includes a low-resolution frame memory 112, a look-up table LUT, and a selection circuit 113. A storage capacity of the low-resolution frame memory 112 is less than a storage capacity of the storage region of the frame memory 111 described above for storing the high-resolution image signal VIDH of R. For example, a storage capacity of the low-resolution frame memory 112 is a quarter of the storage capacity of the frame memory 111.

Further, the low-resolution frame memory 112 may include a storage capacitor that stores at least a low-resolution image signal VIDL for one screen.

The look-up table LUT is supplied with a current low-resolution image signal VIDL and a low-resolution image signal VIDL for one previous unit period read from the low-resolution frame memory 112. In the following description, the current low-resolution image signal VIDL will be referred to as a first image signal Vx, and the previous low-resolution image signal VIDL will be referred to as a second image signal Vy.

The look-up table LUT stores the first image signal Vx and the second image signal Vy and an image signal Dod for overdrive in association with each other. For example, the image signal Dod is given in the following equation [1].

$$Dod = f_1(Vx, Vy) \quad [1]$$

The function $f_1$ is determined to obtain a desired grayscale for the liquid crystal panel 10 considering response characteristics of liquid crystal. This compensates for and improves the response characteristics of the liquid crystal panel 10. Further, for example, when the response delay time of the liquid crystal panel is 10 ms, the response delay time is not required to be 0 ms, and if it is shorter than 10 ms, the response characteristics of the liquid crystal panel are compensated for.

If a grayscale indicated by the first image signal Vx is "100" and a grayscale indicated by the second image signal Vy is "10" in overdrive processing, a grayscale indicated by the image signal Dod is greater than "100". This is because, even if the voltage corresponding to the grayscale is applied to the liquid crystal, it takes time to give a response, and thus, the delay time of the liquid crystal is expected so that it is compensated for. For this reason, the image signal Dod is set to have a greater grayscale than "100" that is the original grayscale. On the other hand, if a grayscale indicated by the first image signal Vx is "100" and a grayscale indicated by the second image signal Vy is "100", a grayscale indicated by the image signal Dod is "100". The reason for this is that it is not necessary to compensate for the response characteristics because the current grayscale and the previous grayscale are equal.

In the state B to the state D of the optical path shifting element 100, the image signals Vb, Vc, and Vd are supplied to the look-up table LUT as the first image signal Vx, and the image signals Va, Vb, and Vc are supplied to the look-up table LUT as the second image signal Vy. Here, in the frame immediately before the corresponding frame, if the low-resolution image signal VIDL in the state D of the optical path shifting element 100 is indicated by an image signal Vd', the second image signal Vy is an image signal Vd' in the state A of the frame.

Overdrive processing is performed based on the low-resolution image signal VIDL (Vx) of a target pixel that is subject to the overdrive processing and the low-resolution image signal VIDL (Vy) of the target pixel in the previous state of the optical path shifting element 100. As described above, because the low-resolution frame memory 112 holds the low-resolution image signal VIDL for at least one screen, the low-resolution image signal VIDL of the target pixel in the previous state of the optical path shifting element 100 is identified for the target pixel that is subject to the overdrive processing.

Next, while the selection circuit 113 illustrated in FIG. 8 selects the image signal Dod when the overdrive processing is valid, the selection circuit 113 selects the first image signal Vx when the overdrive processing is not valid to generate an output image signal Dr. The overdrive processing being valid or invalid and a processing method thereof are specified by the control signal CTL2.

As described above, the control signal CTL2 is generated by the timing control circuit 13 based on the high-resolution image signal VIDH and the determination signal DET input from the image determination circuit 11A. Specifically, when the determination result indicated by the determination signal DET is an image with clear boundaries between pixels, the timing control circuit 13 generates a control signal CTL2 such that overdrive processing is performed at a higher response speed from the liquid crystal after a voltage is applied to the liquid crystal compared to when the determination result is an image with unclear boundaries between pixels. Because the response speed from the liquid crystal made after a voltage is applied to the liquid crystal becomes higher, the projection position by the optical path shifting element 100 changes more quickly. Due to the quicker change in the projection position by the optical path shifting element 100, the expression near the boundaries included in the projected image suddenly changes.

Further, in a case of an image with unclear boundaries between pixels, the control signal CTL2 may be a control signal for performing the overdrive processing, or may be a control signal for not performing the overdrive processing. Specifically, the control signal CTL2 may be a control signal for performing the overdrive processing such that the output image signal Dr is equal to Dod in the case of an image with unclear boundaries between pixels, and the output image signal Dr is greater than Dod in the case of an image with clear boundaries between pixels. Alternatively, the control signal CTL2 may be a control signal for performing the overdrive processing such that the output image signal Dr is smaller than Dod in the case of an image with unclear boundaries between pixels, and the output image signal Dr is equal to Dod in the case of an image with clear boundaries between pixels.

In the pixel shift technology for projectors of the related art, it is not possible to switch a state of the optical path shifting element 100 based on whether it is desirable for an image to be displayed to represent a video with the pixels separated from each other. On the other hand, the projector 1 according to the embodiment includes the optical path shifting element drive circuit 12 that controls a state of the optical path shifting element 100 in a transition period in which, among a plurality of unit periods included in one frame period, the element transitions from a first unit period f1 to a second unit period f2 based on the type of the image indicated by the input image signal. In this way, in a case where the projector 1 according to the embodiment displays an image to be expressed with the pixel separated from each other, the projector can display the image with clear boundaries on the projection surface 80.

Additionally, when an image with unclear boundaries between pixels is to be displayed, the projector 1 according to the embodiment can display the image on the projection surface 80 such that the grayscale values change smoothly between the pixels. Furthermore, the projector 1 according to the embodiment can perform the image shift appropriately even when any image is to be displayed on the projection surface 80.

Additionally, the timing control circuit 13 described above controls a speed of change of the state of the optical path shifting element 100 in the transition period described above based on the type of image. The projector 1 according to the embodiment is capable of controlling a speed of change of a state of the optical path shifting element 100 in the transition period in which the element transitions from the first unit period f1 to the second unit period f2 based on the type of image, and thus can display the image with clear boundaries on the projection surface 80 when the image to be expressed with the pixels separated from each other is to be displayed. Additionally, when the image with unclear boundaries between pixels is to be displayed, the projector 1 according to the embodiment can display the image on the projection surface 80 such that the grayscale values change smoothly between the pixels.

Furthermore, the overdrive processing circuit 11C adjusts the compensation amount determined due to the overdrive processing based on the type of image. This allows the projector 1 according to the embodiment to change the overdrive processing to change the speed of a response of the liquid crystal based on the type of image to be displayed. Furthermore, the projector 1 according to the embodiment has the pixels separated from each other to display an image with clear boundaries between pixels, but can display the image with unclear boundaries between pixels more smoothly.

In addition, the image determination circuit 11A uses a difference value in luminance between the adjacent pixels to identify the type of the image and outputs the type information indicating the identification result to the timing control circuit 13. This enables the projector 1 according to the embodiment to identify the type of the image based on the difference value in luminance between the pixels and to change the state of the optical path shifting element 100 based on the identified type of the image.

Second Embodiment

Next, a drive method for the projector 1 according to the second embodiment of the present disclosure will be described with reference to FIGS. 10 and 11. Hereinafter, a difference between the drive method for the projector 1 according to the second embodiment and the drive method for the projector 1 according to the first embodiment will be mainly described.

Figure 10:
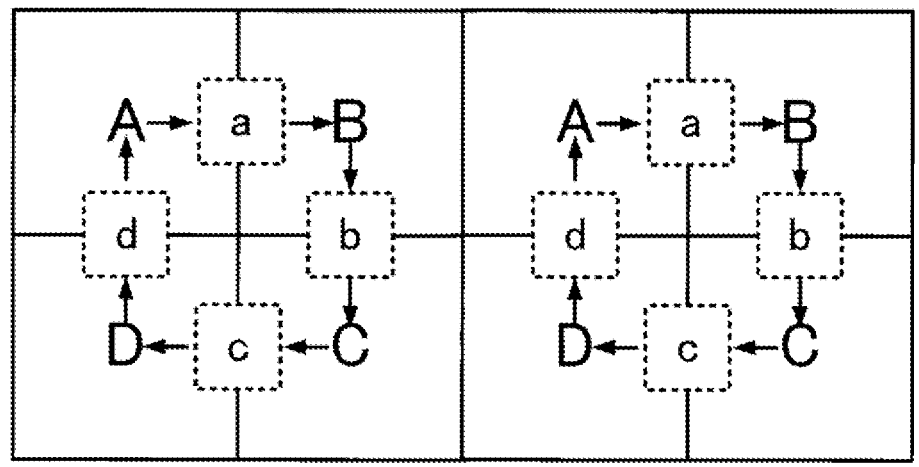
FIG. 10 is a descriptive diagram of projection positions of an optical path shifting element according to a second embodiment.

FIG. 10 is a diagram illustrating states of the optical path shifting element 100, specifically, projection positions by the optical path shifting element 100. To be specific, "A", "B", "C", and "D" on the left side in FIG. 10 correspond to "A1", "B1", "C1", and "D1" illustrated in FIG. 5, respectively, as an example. In addition, "A", "B", "C", and "D" on the right side in FIG. 10 correspond to "A2", "B2", "C2", and "D2" illustrated in FIG. 5, respectively, as an example.

Figure 11:
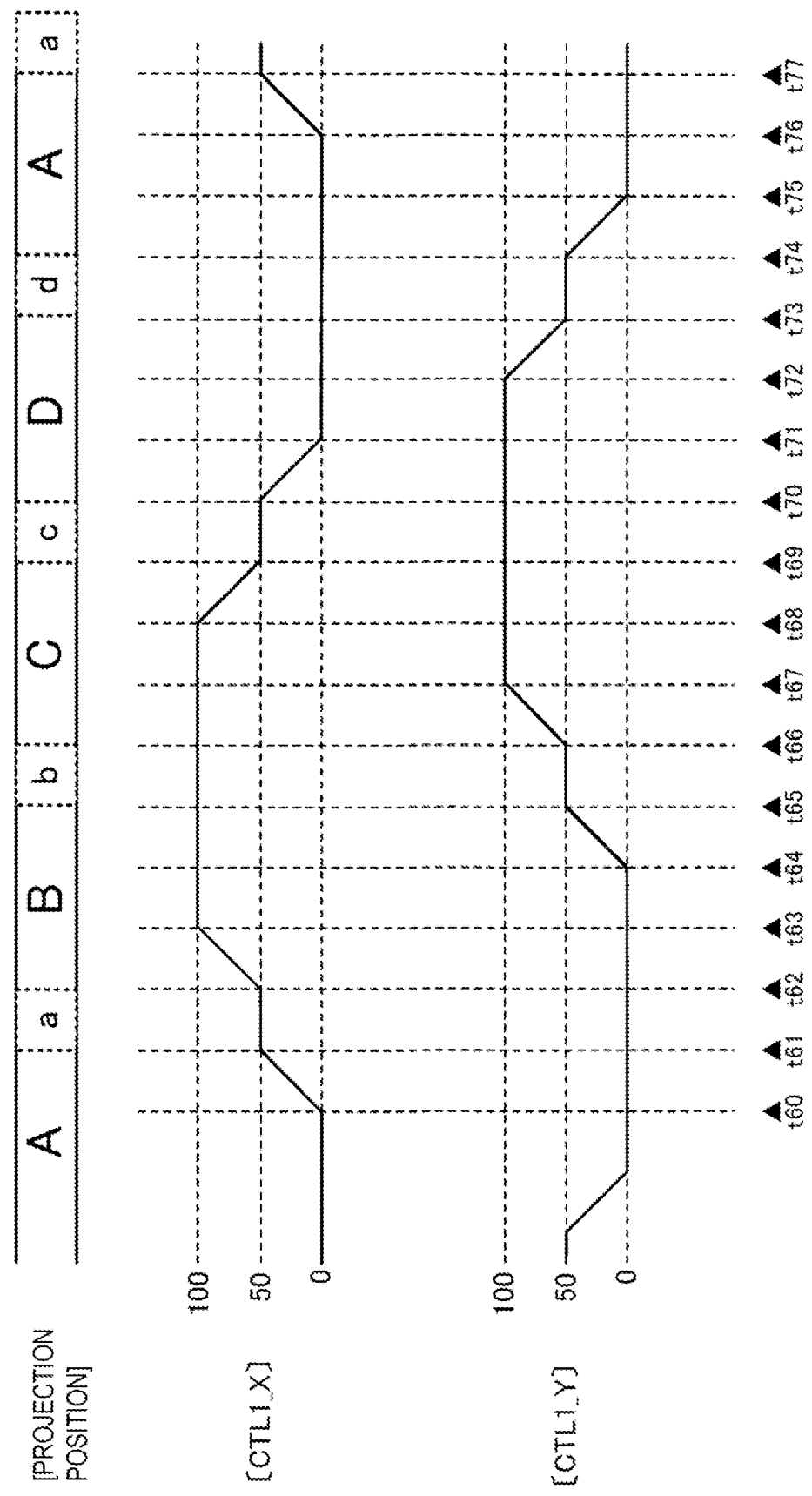
FIG. 11 is a descriptive diagram of a relationship between projection positions of the optical path shifting element and control signals over time according to the second embodiment.

FIG. 11 is a diagram illustrating a relationship between the projection positions by the optical path shifting element 100 and the control signals CTL1_X and CTL1_Y over time that is a relationship over time in display of a natural image. Further, FIG. 11 shows a highest value of CTL1_X and CTL1_Y at 100V and a lowest value thereof at 0V as an example. However, an aspect of the embodiment is not limited thereto. In addition, because the relationship between the projection positions of the optical path shifting element 100 and the control signals CTL1_X and CTL1_Y over time in display of a character drawing is similar to that of the first embodiment, description thereof will be omitted. In a third embodiment to a seventh embodiment to be described below, description of the relationship between the projection positions of the optical path shifting element 100 and the control signals CTL1_X and CTL1_Y over time in display of the character drawing will be omitted as well.

A transition state a is set between the state A and the state B in display of a natural image display by the projector 1 as illustrated in FIG. 10. More specifically, a transition period T1 corresponding to the transition state a is set between the first unit period f1 corresponding to the state A and the second unit period f2 corresponding to the state B. Similarly, a transition state b is set between the state B and the state C. More specifically, a transition period T2 corresponding to the transition state b is set between the second unit period f2 corresponding to the state B and the third unit period f3 corresponding to the state C. Similarly, a transition state c is set between the state C and the state D. More specifically, a transition period T3 corresponding to the transition state c is set between the third unit period f3 corresponding to the state C and the fourth unit period f4 corresponding to the state D. Similarly, a transition state d is set between the state C and the state D. More specifically, a transition period T4 corresponding to the transition state d is set between the fourth unit period f4 corresponding to the state D and the unit period f1 corresponding to the state A.

In addition, a projection position (a) while the state of the optical path shifting element 100 is the transition state a is the midpoint between the projection position (A) and the projection position (B). Similarly, a projection position (b) while the state of the optical path shifting element 100 is the transition state b is the midpoint between the projection position (B) and the projection position (C). Similarly, a projection position (c) while the state of the optical path shifting element 100 is the transition state c is the midpoint between the projection position (C) and the projection position (D). Similarly, a projection position (d) while the state of the optical path shifting element 100 is the transition state d is the midpoint between the projection position (D) and the projection position (A).

Further, for example, an intermediate image of the image displayed while the state of the optical path shifting element 100 is the state A and the image displayed while the state thereof is the state B may be displayed while the state is in the transition state a. Specifically, when the output image signal Dr differs between while the state of the optical path shifting element 100 is the state A and the state is the state B, the output image signal Dr while the state of the optical path shifting element 100 is the transition state a may be an intermediate signal of the output image signal Dr while the state is the state A and the output image signal Dr while the state is the state B. The output image signals Dg and Db while the state of the optical path shifting element 100 is the transition state a are also determined in a similar method to that for the output image signal Dr.

Alternatively, as an example, the image signal Dod for overdriving while the state of the optical path shifting element 100 is the transition state a may be a signal having a higher output value than the intermediate signal of the output image signal Dr while the state is the state A and the output image signal Dr while the state is the state B. Alternatively, as an example, the image signal Dod for the overdriving while the state of the optical path shifting element 100 is the transition state a may be calculated using the above formula [1] with the low-resolution image signal VIDL in the state B set as the first image signal Vx and the low-resolution image signal VIDL in the state A set as the second image signal Vy.

Although the operation performed while the state of the optical path shifting element 100 is the transition state a has been described above, the projector 1 performs similar operations while the state of the optical path shifting element 100 is one of the transition states b to d. That is, when an image to be displayed differs between while the state of the optical path shifting element 100 is the state B and the state thereof is the state C, an intermediate image of the image displayed while the state of the optical path shifting element 100 is the state B and the image displayed while the state is the state C may be displayed while the optical path shifting element 100 is in the transition state b. Similarly, when an image to be displayed differs between while the state of the optical path shifting element 100 is the state C and the state thereof is the state D, an intermediate image of the image displayed while the state of the optical path shifting element 100 is the state D and the image displayed while the state is the state C may be displayed while the state is in the transition state c. Similarly, when an image to be displayed differs between while the state of the optical path shifting element 100 is the state D and the state thereof is the state A, an intermediate image of the image displayed while the state of the optical path shifting element 100 is the state D and the image displayed while the state is the state A may be displayed while the optical path shifting element 100 is in the transition state d.

When the determination result by the image determination circuit 11A is a natural image, the voltage of the control signal CTL1_X increases from the lowest value to an intermediate value in the period from a timing t60 to a timing t61 as illustrated in FIG. 11. Furthermore, the voltage of the control signal CTL1_X is maintained at the intermediate value in the period from the timing t61 to a timing t62. Furthermore, the voltage of the control signal CTL1_X increases from the intermediate value to the highest value in the period from the timing t62 to a timing t63. Furthermore, the voltage of the control signal CTL1_X is maintained at the highest value in the period from the timing t63 to a timing t68. Furthermore, the voltage of the control signal CTL1_X decreases from the highest value to the intermediate value in the period from the timing t68 to a timing t69. Furthermore, the voltage of the control signal CTL1_X is maintained at the intermediate value in the period from the timing t69 to a timing t70. Furthermore, the voltage of the control signal CTL1_X decreases from the intermediate value to the lowest value in the period from the timing t70 to a timing t71. Furthermore, the voltage of the control signal CTL1_X is maintained at the lowest value in the period from the timing t71 to a timing t76. Furthermore, the voltage of the control signal CTL1_X increases from the lowest value to the intermediate value in the period from the timing t76 to a timing t77.

Furthermore, the voltage of the control signal CTL1_Y is maintained at the lowest value in the period from the timing t60 to a timing t64. Furthermore, the voltage of the control signal CTL1_Y increases from the lowest value to the intermediate value in the period from the timing t64 to a timing t65. Furthermore, the voltage of the control signal CTL1_Y is maintained at the intermediate value in the period from the timing t65 to a timing t66. Furthermore, the voltage of the control signal CTL1_Y increases from the intermediate value to the highest value in the period from the timing t66 to a timing t67. Furthermore, the voltage of the control signal CTL1_Y is maintained at the highest value in the period from the timing t67 to a timing t72. Furthermore, the voltage of the control signal CTL1_Y decreases from the highest value to the intermediate value in the period from the timing t72 to a timing t73. Furthermore, the voltage of the control signal CTL1_Y is maintained at the intermediate value in the period from the timing t73 to a timing t74. Furthermore, the voltage of the control signal CTL1_Y decreases from the intermediate value to the lowest value in the period from the timing t74 to a timing t75. Furthermore, the voltage of the control signal CTL1_Y is maintained at the lowest value in the period from the timing t75 to the timing t77.

Thus, the state of the optical path shifting element 100 starts to transition from the state A to the transition state a at the timing t60. Furthermore, the state of the optical path shifting element 100 ends the transition to the transition state a at the timing t61. Furthermore, the state of the optical path shifting element 100 is maintained in the transition state a in the period from the timing t61 to the timing t62. Also at the timing t62, the state of the optical path shifting element 100 starts to transition from the transition state a to the state B. Furthermore, the state of the optical path shifting element 100 ends the transition to the state B at the timing t63. Furthermore, the state of the optical path shifting element 100 is maintained in the state B in the period from the timing t63 to the timing t64. Also at the timing t64, the state of the optical path shifting element 100 starts to transition from the state B to the transition state b. Furthermore, the state of the optical path shifting element 100 ends the transition to the transition state b at the timing t65. Furthermore, the state of the optical path shifting element 100 is maintained in the transition state b in the period from the timing t65 to the timing t66. Also at the timing t66, the state of the optical path shifting element 100 starts to transition from transition state b to the state C. In addition, the state of the optical path shifting element 100 ends the transition to the state C at the timing t67. Furthermore, the state of the optical path shifting element 100 is maintained in the state C in the period from the timing t67 to the timing t68. Also at the timing t68, the state of the optical path shifting element 100 starts to transition from the state C to the transition state c. Furthermore, the state of the optical path shifting element 100 ends the transition to the transition state c at the timing t69. Furthermore, the state of the optical path shifting element 100 is maintained in the transition state c in the period from the timing t69 to the timing t70. Also at the timing t70, the state of the optical path shifting element 100 starts to transition from the transition state c to the state D. In addition, the state of the optical path shifting element 100 ends the transition to the state D at the timing t71. Furthermore, the state of the optical path shifting element 100 is maintained in the state D in the period from the timing t71 to the timing t72. Also at the timing t72, the state of the optical path shifting element 100 starts to transition from the state D to the transition state d. Furthermore, the state of the optical path shifting element 100 ends the transition to the transition state d at the timing t73. Furthermore, the state of the optical path shifting element 100 is maintained in the transition state d in the period from the timing t73 to the timing t74. Also at the timing t74, the state of the optical path shifting element 100 starts to transition from the transition state d to the state A. Furthermore, the state of the optical path shifting element 100 ends the transition to the state A at the timing t75. Furthermore, the state of the optical path shifting element 100 is maintained in the state A in the period from the timing t75 to the timing t76. Also at the timing t76, the state of the optical path shifting element 100 starts to transition from the state A to the transition state a. Furthermore, the state of the optical path shifting element 100 ends the transition to the transition state a at the timing t77.

As described above, the state of the optical path shifting element 100 transitions from the state A to the state A again passing through the transition state a, the state B, the transition state b, the state C, the transition state c, the state D, and the transition state d.

In the embodiment, the timing control circuit 13 described above controls the amount of change in the state of the optical path shifting element 100 in the transition periods described above based on the type of the image. In more detail, when an image to be expressed with pixels separated from each other is to be displayed, the timing control circuit 13 changes a position at which light is projected by the optical path shifting element 100 from the projection position (A) to the projection position (B) as an example. On the other hand, when an image with unclear boundaries between pixels is to be displayed, the timing control circuit 13 changes a position at which light is projected by the optical path shifting element 100 from the projection position (A) to the projection position (a) or from the projection position (a) to the projection position (B) as an example. The projector 1 according to the embodiment is capable of controlling the amount of change in the state of the optical path shifting element 100 in the transition periods in which the element transitions from the first unit period f1 to the second unit period f2 based on the type of the image, and thus can display the image with a desirable pixel interval.

In the embodiment, the timing control circuit 13 controls a state of the optical path shifting element 100 such that, in the first transition period T1 in which a unit period transitions from the first unit period f1 to the second unit period f2, light emitted from a predetermined pixel reaches the projection position (a) that is a third position on the display screen that differs from the projection position (A) that is a first position on the display screen that the light reaches in the first unit period f1 and the projection position (B) that is a second position on the display screen that the light reaches in the second unit period f2. In particular, in the embodiment, the projection position (a) is a position in the middle of the projection position (A) and the projection position (B). In the related art, the projection position in the first unit period f1 is the projection position (A), and when the projection position in the second unit period f2 is the projection position (B). On the other hand, when an image with unclear boundaries between pixels is to be displayed in the embodiment, the optical path shifting element 100 emits light to the projection position (a) in the middle of the projection position (A) and the projection position (B) as illustrated in FIG. 10 in the transition period in which transition is made from the first unit period to the second unit period. This allows the projector 1 to display the image with unclear boundaries between pixels so that the intervals between the pixels are unnoticeable.

In addition, the image processing circuit 11 generates an image signal to be supplied to the liquid crystal panel 10 as an image signal in the transition period T1 based on the first image signal Vx to be supplied to the liquid crystal panel 10 in the first unit period f1 and the second image signal Vy to be supplied to the liquid crystal panel 10 in the second unit period f2. Furthermore, the image processing circuit 11 sets the output image signal Dr in the transition state a between the state A in the first unit period f1 and the state B in the second unit period f2 as an intermediate signal between the output image signal Dr while being in the state A and the output image signal Dr while being in the state B. As a result, when an image with unclear boundaries between pixels is to be displayed, the projector 1 can display the image such that the intervals of the pixels are unnoticeable.

Third Embodiment

Next, a drive method for a projector 1 according to the third embodiment of the present disclosure will be described with reference to FIGS. 12 to 14. Hereinafter, a difference between the drive method for the projector 1 according to the third embodiment and the drive method for the projector 1 according to the first and second embodiments will be mainly described.

Further, it is assumed in the first and second embodiments that one frame period is divided into four unit periods including the first unit period f1, the second unit period f2, a third unit period f3, and a fourth unit period f4. Meanwhile, it is assumed in the first and second embodiments that the first unit period is f2, the second unit period is f4, and the third unit period is f3, and the fourth unit period is f1. In addition, in the first and second embodiments, the projection position (A) is set to a "first position", the projection position (B) is set to a "second position", and the projection position (a) is set to a "third position" as an example. Meanwhile, in the embodiment, the projection position (B) is set to a "first position", the projection position (D) is set to a "second position", the projection position (a) is set to a "third position", the projection position (C) is set to a "fourth position", and the projection position (A) is set to a "fifth position" as an example.

Figure 12:
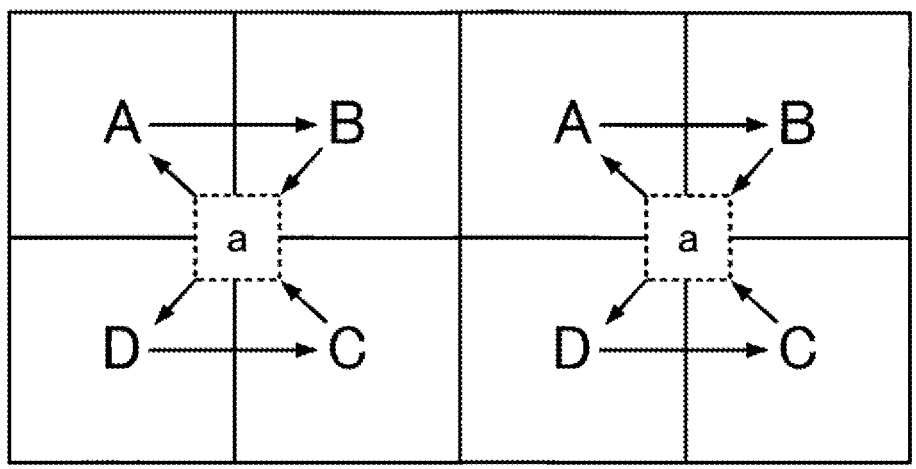
FIG. 12 is a descriptive diagram of projection positions of an optical path shifting element according to a third embodiment.
Figure 12:
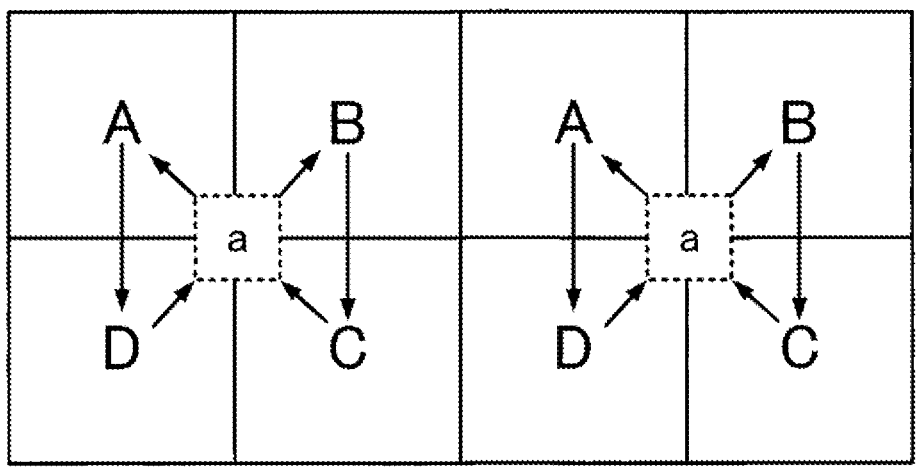

FIG. 12 is a diagram illustrating states of the optical path shifting element 100, specifically, projection positions by the optical path shifting element 100. To be more specific, "A", "B", "C", and "D" on the left side in both "video odd-numbered frame" and "video even-numbered frame" in FIG. 12 correspond to "A1", "B1", "C1", and "D1" illustrated in FIG. 5, respectively, as an example. In addition, "A", "B", "C", and "D" on the right side in both "video odd-numbered frame" and "video even-numbered frame" in FIG. 12 correspond to "A2", "B2", "C2", and "D2" illustrated in FIG. 5, respectively, as an example.

Figure 13A:
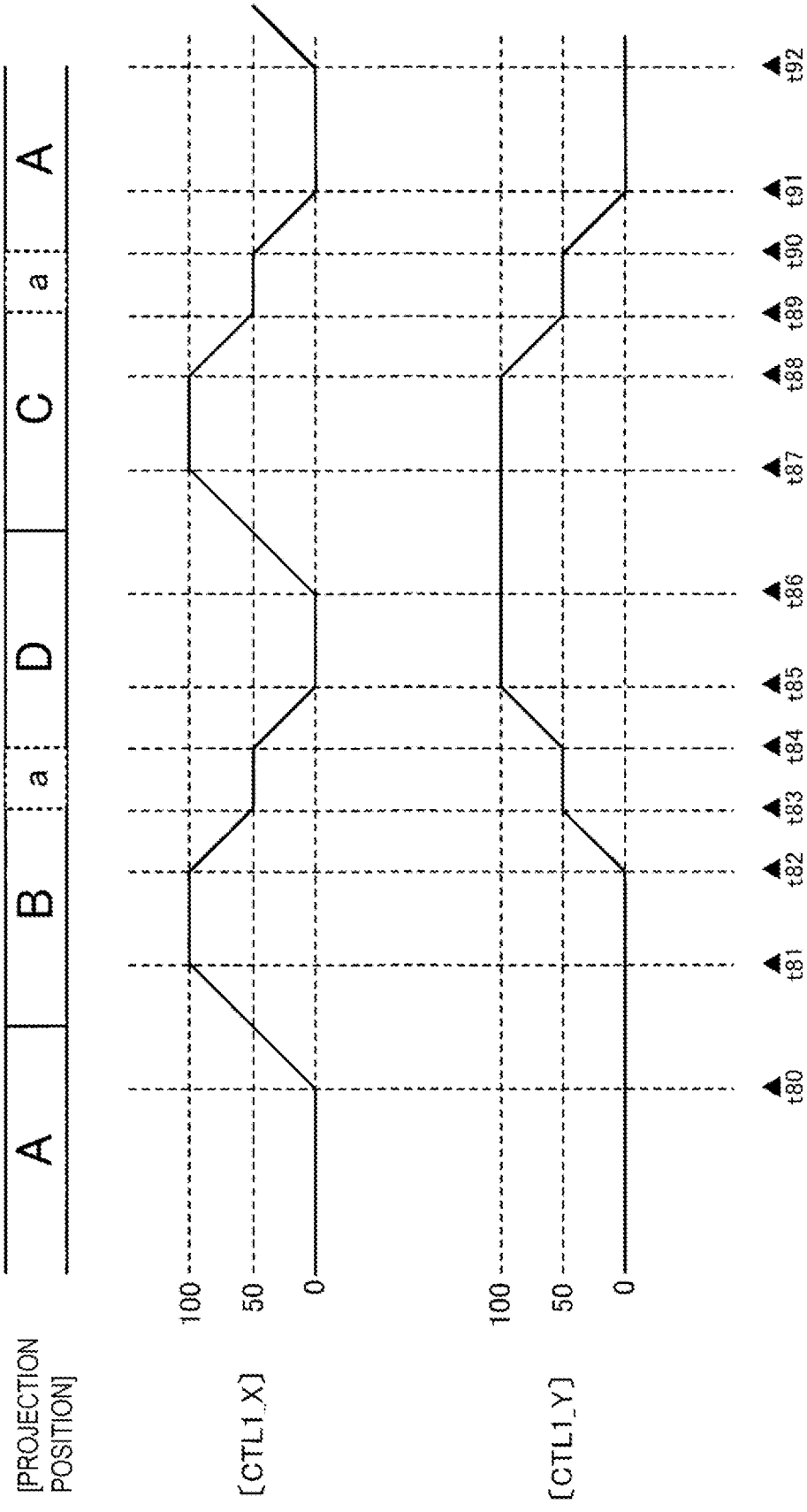
FIG. 13A is a descriptive diagram of a relationship between projection positions of the optical path shifting element and control signals over time according to the third embodiment.
Figure 13B:
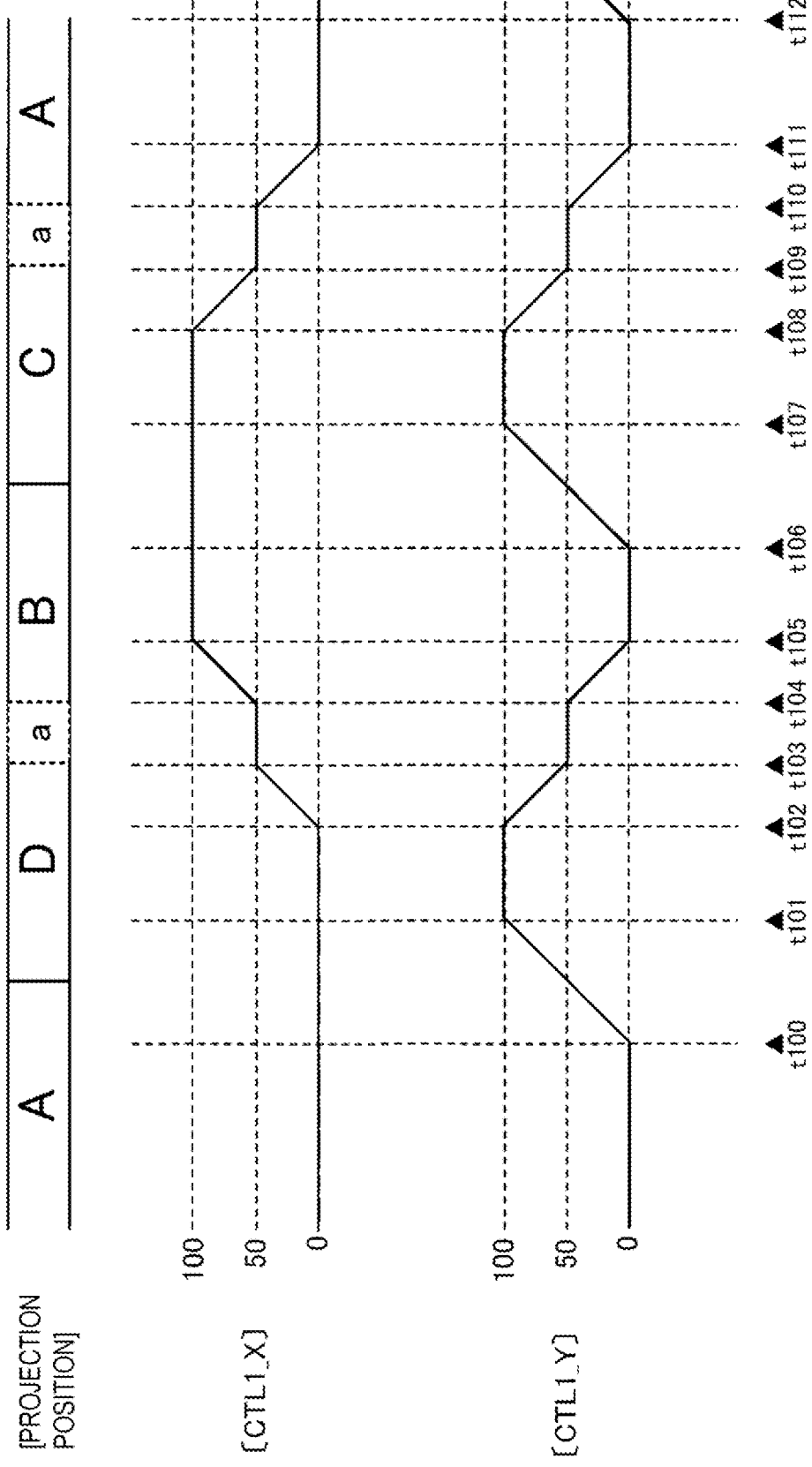
FIG. 13B is a descriptive diagram of a relationship between the projection positions of the optical path shifting element and the control signals over time according to the third embodiment.

FIGS. 13A and 13B are diagrams illustrating a relationship between the projection positions by the optical path shifting element 100 and the control signals CTL1_X and CTL1_Y over time that is a relationship over time in display of a natural image. In more detail, FIG. 13A is a diagram illustrating a relationship over time when displaying an odd-numbered frame of a video in display of a natural image. On the other hand, FIG. 13B is a diagram illustrating a relationship over time when displaying an even-numbered frame of a video in display of a natural image. Further, in FIGS. 13A and 13B, a highest value of CTL1_X and CTL1_Y is set to 100V, and a lowest value thereof is set to 0V as an example. However, an aspect of the embodiment is not limited thereto. In addition, because the relationship between the projection positions of the optical path shifting element 100 and the control signals CTL1_X and CTL1_Y over time in display of a character drawing is similar to that in the first embodiment, description thereof will be omitted.

As illustrated in FIG. 12, when a natural image is to be displayed by the projector 1, order in which a state of the optical path shifting element 100 is switched is made to differ between when an odd-numbered frame of a video is displayed and when an even-numbered frame of the video is displayed. Specifically, when an odd-numbered frame of a video is to be displayed, the state of the optical path shifting element 100 transitions in order of the state A, the state B, the transition state a, the state D, the state C, the transition state a, the state A, and the like. On the other hand, when an even-numbered frame of a video is to be displayed, the state of the optical path shifting element 100 transitions in order of the state A, the state D, the transition state a, the state B, the state C, the transition state a, the state A, and the like.

Furthermore, the projection position while the state of the optical path shifting element 100 is the transition state a is the center of the square with four vertexes including the projection position (A), the projection position (B), the projection position (C), and the projection position (D).

Further, when an odd-numbered frame of a video is to be displayed, if an image to be displayed differs between while the state of the optical path shifting element 100 is the state B and the state is the state D, an intermediate image of the image displayed while the state of the optical path shifting element 100 is the transition state B and the image displayed while the state of the optical path shifting element 100 is the state D may be displayed while the state thereof is the transition state a. Specifically, when the output image signals Dr, Dg, and Db differ between while the state of the optical path shifting element 100 is the state B and the state is the state D, the output image signal Dr while the state of the optical path shifting element 100 is the transition state a may be an intermediate signal of the output image signal Dr while the state is the state B and the output image signal Dr while the state is the state D. The same applies to the output image signals Dg and Db.

Thus, as an example, the image signal Dod for the overdriving while the state of the optical path shifting element 100 is the transition state a that is between the state B and the state D may be calculated using the above formula [1] with the low-resolution image signal VIDL in the state D set as the first image signal Vx and the low-resolution image signal VIDL in the state B set as the second image signal Vy.

Further, when an odd-numbered frame of a video is to be displayed, the output image signal Dr in the transition state a that is between the state C and the state A when an image to be displayed differs between while the state of the optical path shifting element 100 is the state C and while the state is the state A is an intermediate signal of the output image signal Dr while the element is in the state C and the output image signal Dr while the element is in the state A, similarly to the output image signal Dr in the transition state a that is between the state B and the state D.

Further, when an even-numbered frame of a video is to be displayed, if an image to be displayed differs between while the state of the optical path shifting element 100 is the state D and the state is the state B, an intermediate image of the image displayed while the state of the optical path shifting element 100 is the state D and the image displayed while the state thereof is the state B may be displayed while the state is in the transition state a. Specifically, when the output image signals Dr, Dg, and Db differ between while the state of the optical path shifting element 100 is the state D and the state thereof is the state B, the output image signal Dr while the state of the optical path shifting element 100 is the transition state a may be an intermediate signal of the output image signal Dr while the state is the state D and the output image signal Dr while the state is the state B. The same applies to the output image signals Dg and Db.

Thus, as an example, the image signal Dod for the overdriving while the state of the optical path shifting element 100 is the transition state a that is between the state D and the state B may be calculated using the above formula [1] with the low-resolution image signal VIDL in the state B set as the first image signal Vx and the low-resolution image signal VIDL in the state D set as the second image signal Vy.

Further, when the even-numbered frame of the video is to be displayed, the same applies to the transition state a that is between the state C and the state A when an image to be displayed differs between while the state of the optical path shifting element 100 is the state C and while the state thereof is the state A.

As illustrated in FIG. 13A, when the determination result by the image determination circuit 11A is a natural image and an odd-numbered frame of a video is to be displayed, the voltage of the control signal CTL1_X increases from the lowest value to the highest value in the period from a timing t80 to a timing t81. Furthermore, the voltage of the control signal CTL1_X is maintained at the highest value in the period from the timing t81 to a timing t82. Furthermore, the voltage of the control signal CTL1_X decreases from the highest value to the intermediate value in the period from the timing t82 to a timing t83. Furthermore, the voltage of the control signal CTL1_X is maintained at the intermediate value in the period from the timing t83 to a timing t84. Furthermore, the voltage of the control signal CTL1_X decreases from the intermediate value to the lowest value in the period from the timing t84 to a timing t85. Furthermore, the voltage of the control signal CTL1_X is maintained at the lowest value in the period from the timing t85 to the timing t86. In addition, the voltage of the control signal CTL1_X increases from the lowest value to the highest value in the period from the timing t86 to a timing t87. Furthermore, the voltage of the control signal CTL1_X is maintained at the highest value in the period from the timing t87 to a timing t88. Furthermore, the voltage of the control signal CTL1_X decreases from the highest value to the intermediate value in the period from the timing t88 to a timing t89. Furthermore, the voltage of the control signal CTL1_X is maintained at the intermediate value in the period from the timing t89 to a timing t90. Furthermore, the voltage of the control signal CTL1_X decreases from the intermediate value to the lowest value in the period from the timing t90 to a timing t91. Furthermore, the voltage of the control signal CTL1_X is maintained at the lowest value in the period from the timing t91 to the timing t92.

Furthermore, the voltage of the control signal CTL1_Y is maintained at the lowest value in the period from the timing t80 to the timing t82. Furthermore, the voltage of the control signal CTL1_Y increases from the lowest value to the intermediate value in the period from the timing t82 to the timing t83. Furthermore, the voltage of the control signal CTL1_Y is maintained at the intermediate value in the period from the timing t83 to the timing t84. Furthermore, the voltage of the control signal CTL1_Y increases from the intermediate value to the highest value in the period from the timing t84 to the timing t85. Furthermore, the voltage of the control signal CTL1_Y is maintained at the highest value in the period from the timing t85 to the timing t88. Furthermore, the voltage of the control signal CTL1_Y decreases from the highest value to the intermediate value in the period from the timing t88 to a timing t89. Furthermore, the voltage of the control signal CTL1_Y is maintained at the intermediate value in the period from the timing t89 to the timing t90. Furthermore, the voltage of the control signal CTL1_Y decreases from the intermediate value to the lowest value in the period from the timing t90 to a timing t91. Furthermore, the voltage of the control signal CTL1_Y is maintained at the lowest value in the period from the timing t91 to the timing t92.

Thus, the state of the optical path shifting element 100 starts to transition from the state A to the state B at the timing t80. In addition, the state of the optical path shifting element 100 ends the transition to the state B at the timing T81. Furthermore, the state of the optical path shifting element 100 is maintained in the state B in the period from the timing t81 to the timing t82. Also at the timing t82, the state of the optical path shifting element 100 starts to transition from the state B to the transition state a. Furthermore, the state of the optical path shifting element 100 ends the transition to the transition state a at the timing t83. Furthermore, the state of the optical path shifting element 100 is maintained in the transition state a in the period from the timing t83 to the timing t84. Also at the timing t84, the state of the optical path shifting element 100 starts to transition from the transition state a to the state D. In addition, the state of the optical path shifting element 100 ends the transition to the state D at the timing t85. Furthermore, the state of the optical path shifting element 100 is maintained in the state D in the period from the timing t85 to the timing t86. Also at the timing t86, the state of the optical path shifting element 100 starts to transition from the state D to the state C. In addition, the state of the optical path shifting element 100 ends the transition to the state C at the timing t87. Furthermore, the state of the optical path shifting element 100 is maintained in the state C in the period from the timing t87 to the timing t88. Also at the timing t88, the state of the optical path shifting element 100 starts to transition from the state C to the transition state a. Furthermore, the state of the optical path shifting element 100 ends the transition to the transition state a at the timing t89. Furthermore, the state of the optical path shifting element 100 is maintained in the transition state a in the period from the timing t89 to the timing t90. Also at the timing t90, the state of the optical path shifting element 100 starts to transition from the transition state a to the state A. In addition, the state of the optical path shifting element 100 ends the transition to the state A at the timing t91. Furthermore, the state of the optical path shifting element 100 is maintained in the state A in the period from the timing t91 to the timing t92. Also at the timing t92, the state of the optical path shifting element 100 starts to transition from the state A to the state B.

As described above, the state of the optical path shifting element 100 transitions from the state A to the state A again passing through the state B, the transition state a, the state D, the state C, and the transition state a.

As illustrated in FIG. 13B, when the determination result by the image determination circuit 11A is a natural image and an even-numbered frame of a video is to be displayed, the voltage of the control signal CTL1_X is maintained at the lowest value in the period from a timing t100 to a timing t102. Furthermore, the voltage of the control signal CTL1_X increases from the lowest value to the intermediate value in the period from the timing t102 to a timing t103. Furthermore, the voltage of the control signal CTL1_X is maintained at the intermediate value in the period from the timing t103 to a timing t104. Furthermore, the voltage of the control signal CTL1_X increases from the intermediate value to the highest value in the period from the timing t104 to a timing t105. Furthermore, the voltage of the control signal CTL1_X is maintained at the highest value in the period from the timing t105 to a timing t108. Furthermore, the voltage of the control signal CTL1_X decreases from the highest value to the intermediate value in the period from the timing t108 to a timing t109. Furthermore, the voltage of the control signal CTL1_X is maintained at the intermediate value in the period from the timing t109 to a timing t110. Furthermore, the voltage of the control signal CTL1_X decreases from the intermediate value to the lowest value in the period from the timing t110 to a timing t111. Furthermore, the voltage of the control signal CTL1_X is maintained at the lowest value in the period from the timing t111 to a timing t112.

Furthermore, the voltage of the control signal CTL1_Y increases from the lowest value to the highest value in the period from the timing t100 to a timing t101. Furthermore, the voltage of the control signal CTL1_Y is maintained at the highest value in the period from the timing t101 to the timing t102. Furthermore, the voltage of the control signal CTL1_Y decreases from the highest value to the intermediate value in the period from the timing t102 to the timing t103. Furthermore, the voltage of the control signal CTL1_Y is maintained at the intermediate value in the period from the timing t103 to the timing t104. Furthermore, the voltage of the control signal CTL1_Y decreases from the intermediate value to the lowest value in the period from the timing t104 to the timing t105. Furthermore, the voltage of the control signal CTL1_Y is maintained at the lowest value in the period from the timing t105 to a timing t106. In addition, the voltage of the control signal CTL1_Y increases from the lowest value to the highest value in the period from the timing t106 to the timing t107. Furthermore, the voltage of the control signal CTL1_Y is maintained at the highest value in the period from the timing t107 to the timing t108. Furthermore, the voltage of the control signal CTL1_Y decreases from the highest value to the intermediate value in the period from the timing t108 to the timing t109. Furthermore, the voltage of the control signal CTL1_Y is maintained at the intermediate value in the period from the timing t109 to the timing t110. Furthermore, the voltage of the control signal CTL1_Y decreases from the intermediate value to the lowest value in the period from the timing t110 to the timing t111. Furthermore, the voltage of the control signal CTL1_Y is maintained at the lowest value in the period from the timing t111 to the timing t112.

Thus, the state of the optical path shifting element 100 starts to transition from the state A to the state D at the timing t100. In addition, the state of the optical path shifting element 100 ends the transition to the state D at the timing t101. Furthermore, the state of the optical path shifting element 100 is maintained in the state D in the period from the timing t101 to the timing t102. Also at the timing t102, the state of the optical path shifting element 100 starts to transition from the state D to the transition state a. Furthermore, the state of the optical path shifting element 100 ends the transition to the transition state a at the timing t103. Furthermore, the state of the optical path shifting element 100 is maintained in the transition state a in the period from the timing t103 to the timing t104. Also at the timing t104, the state of the optical path shifting element 100 starts to transition from the transition state a to the state B. In addition, the state of the optical path shifting element 100 ends the transition to the state B at the timing t105. Furthermore, the state of the optical path shifting element 100 is maintained in the state B in the period from the timing t105 to the timing t106. Also at the timing t106, the state of the optical path shifting element 100 starts to transition from the state B to the state C. In addition, the state of the optical path shifting element 100 ends the transition to the state C at the timing t107. Furthermore, the state of the optical path shifting element 100 is maintained in the state C in the period from the timing t107 to the timing t108. Also at the timing t108, the state of the optical path shifting element 100 starts to transition from the state C to the transition state a. Furthermore, the state of the optical path shifting element 100 ends the transition to the transition state a at the timing t109. Furthermore, the state of the optical path shifting element 100 is maintained in the transition state a in the period from the timing t109 to the timing t110. Also at the timing t110, the state of the optical path shifting element 100 starts to transition from the transition state a to the state A. In addition, the state of the optical path shifting element 100 ends the transition to the state A at the timing t111. Furthermore, the state of the optical path shifting element 100 is maintained in the state A in the period from the timing t11 to the timing t112. Also at the timing t112, the state of the optical path shifting element 100 starts to transition from the state A to the state B.

As described above, the state of the optical path shifting element 100 transitions from the state A to the state A again passing through the state D, the transition state a, the state B, the state C, and the transition state a.

In the embodiment, when pixels to be displayed move in the horizontal direction and the vertical direction, the transition time is shorter like, for example, the time from t80 to t81, and when pixels to be displayed move in a diagonal direction, the transition time is longer like, for example, the time from t82 to t85 as illustrated in FIGS. 13A and 13B. Further, the voltage of the control signal CTL1_X or CTL1_Y is maintained at the intermediate value in the latter transition time. This makes it possible to eliminate display rattling by artfully increasing the amount of information when displaying a diagonal line.

Figure 14:
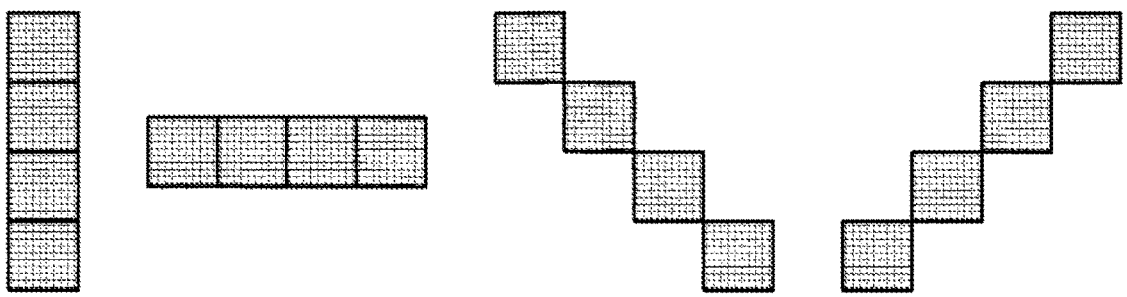
FIG. 14 is a descriptive diagram of an example of display of a projector according to the third embodiment.
Figure 14:
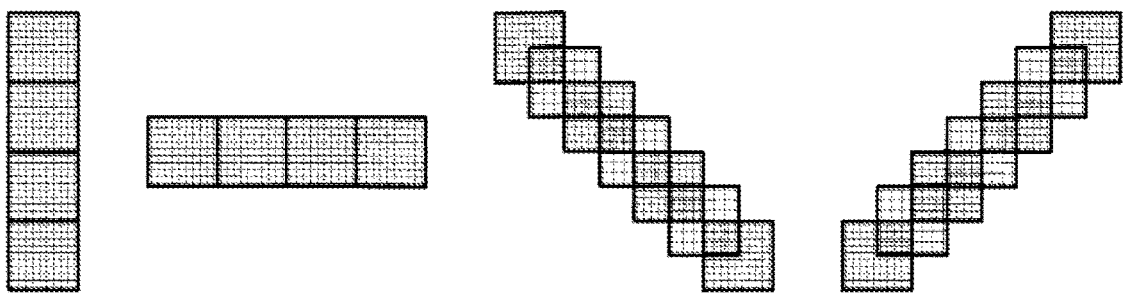

FIG. 14 illustrates a display example as a comparative example and a display example of a display method according to the embodiment. In FIG. 14, the display example of the comparative example illustrated in FIG. 7 is illustrated as well to make it easier to understand the display method according to the embodiment. More specifically, in the upper portion of FIG. 14, a display example of a vertical line, a horizontal line, and diagonal lines according to a method of the related art is illustrated as the comparative example. In addition, in the lower portion of FIG. 14, a display example of a vertical line, a horizontal line, and diagonal lines according to the display method according to the embodiment is illustrated. Comparing the display example as the comparative example to the display example of the display method according to the embodiment, there is no difference between the examples in the display of the vertical lines and the horizontal lines. However, in the display of the diagonal lines according to the embodiment, images corresponding to the transition state a between the state B and the state D and the transition state a between the state A and the state C are displayed in addition to the image displayed in the method of the related art. This lowers the degree of display rattling. Further, in FIG. 14, the image corresponding to the transition state a is indicated by a coarse lattice.

In the embodiment, in a transition period, the projection position by the optical path shifting element 100 is at the center of the square having, as four vertexes, the projection position (B) that is the first position that the projection position reaches in the first unit period f2, the projection position (D) that is the second position that the projection position reaches at the second unit period f4, the projection position (C) that is the third position that the projection position reaches in the third unit period f3, and the projection position (A) that is the fourth position that the projection position reaches in the fourth unit period f1. In addition, when the position to be reached moves on the display screen of light emitted from a predetermined pixel from the first unit period f2 to the fourth unit period f1, and when the position moves in the horizontal direction and the vertical direction, the transition time is shorter, and on the other hand, when the position moves in the diagonal direction, the transition time is longer. This makes it possible to lower the degree of display rattling when displaying diagonal lines.

Furthermore, in the embodiment, depending on whether an odd-numbered frame or an even-numbered frame of a video is to be displayed, movement of the projection position by the optical path shifting element 100 is switched to a combined direction of the horizontal direction and the diagonal direction or a combined direction of the vertical direction and the diagonal direction. The reason for this is that, when the projection position by the optical path shifting element 100 moves only in the combined direction of the horizontal direction and the diagonal direction or the combined direction of the vertical direction and the diagonal direction, asymmetry occurs in the movement direction. Thus, if, as the movement direction of the projection position by the optical path shifting element 100, balance is taken between the combined direction of the horizontal direction and the diagonal direction and the combined direction of the vertical direction and the diagonal direction, symmetry in the movement direction can be maintained. In addition, if all movement directions including the horizontal direction, the vertical direction, and the diagonal direction are mixed for the movement direction of the projection position, and the movement direction is averaged, dot display becomes smoother.

Fourth Embodiment

Next, a drive method for the projector 1 according to a fourth embodiment of the present disclosure will be described with reference to FIGS. 15 and 16. Hereinafter, a difference between the drive method for the projector 1 according to the fourth embodiment and the drive method for the projector 1 according to the first to third embodiments will be mainly described.

Figure 15:
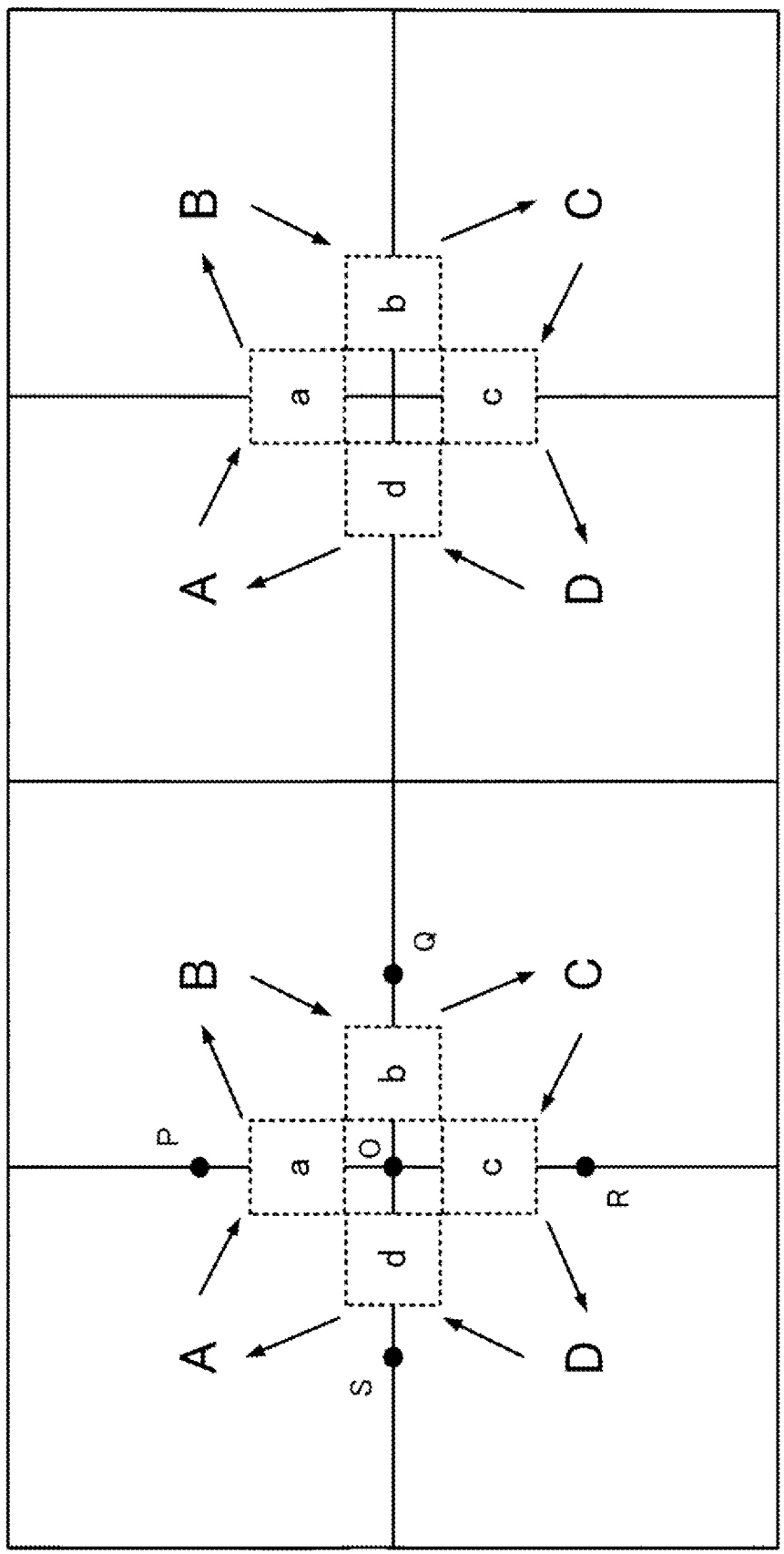
FIG. 15 is a descriptive diagram of projection positions of an optical path shifting element according to a fourth embodiment.

FIG. 15 is a diagram illustrating states of the optical path shifting element 100, specifically, projection positions by the optical path shifting element 100. To be more specific, "A", "B", "C", and "D" on the left side in FIG. 15 correspond to "A1", "B1", "C1", and "D1" illustrated in FIG. 5, respectively, as an example. In addition, "A", "B", "C", and "D" on the right side in FIG. 15 correspond to "A2", "B2", "C2", and "D2" illustrated in FIG. 5, respectively, as an example.

Figure 16:
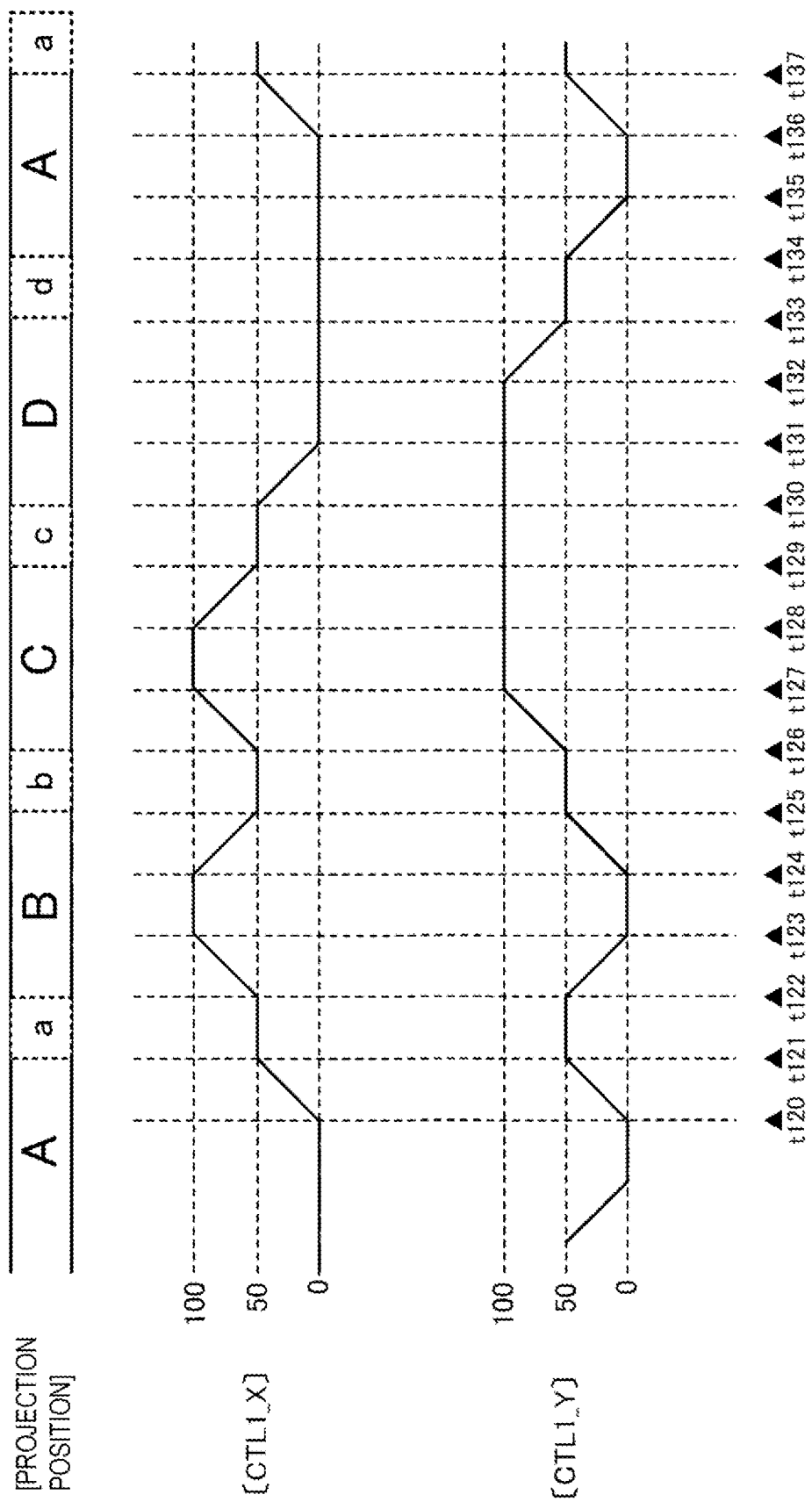
FIG. 16 is a descriptive diagram of a relationship between projection positions of the optical path shifting element and control signals over time according to the fourth embodiment.

FIG. 16 is a diagram illustrating a relationship between a projection position by the optical path shifting element 100 and control signals CTL1_X and CTL1_Y over time. Further, FIG. 16 shows a highest value of CTL1_X and CTL1_Y at 100V, a lowest value thereof at 0V, and an intermediate value at 50V as an example. However, an aspect of the embodiment is not limited thereto.

Comparing FIG. 15 to FIG. 10 illustrating the projection positions by the optical path shifting element 100 according to the second embodiment, the projection positions while the element is in the transition states a to d are the midpoint of the projection position (A) and the projection position (B), the midpoint of the projection position (B) and the projection position (C), the midpoint of the projection position (C) and the projection position (D), and the midpoint of the projection position (D) and the projection position (A) in the second embodiment. On the other hand, in the embodiment, the projection position (a) while the element is in the transition state a is the position between the midpoint P of the projection position (A) and the projection position (B) and the center O of the square having the four vertexes including the projection position (A), the projection position (B), the projection position (C), and the projection position (D). Similarly, the projection position (b) while the element is in the transition state b is the position between the midpoint Q of the projection position (B) and the projection position (C) and the center O of the square. Similarly, the projection position (c) while the element is in the transition state c is the position between the midpoint R of the projection position (C) and the projection position (D) and the center O of the square. Similarly, the projection position (d) while the element is in the transition state d is the position between the midpoint S of the projection position (D) and the projection position (A) and the center O of the square.

Thus, the image shift state transitions to the state A, the transition state a, state B, the transition state b, state C, the transition state c, state D, the transition state d, state A, and the like, but the projection position by the optical path shifting element 100 is always moved obliquely.

As described above, for example, the projection position while the state of the optical path shifting element 100 is in the transition state a is a position closer to the center of the square having the four vertexes including the projection position (A), the projection position (B), the projection position (C), and the projection position (D) than to the midpoint of the projection position (A) and the projection position (B). Thus, if an image to be displayed differs while the state of the optical path shifting element 100 is each of the state A to the state D, the intermediate image of the image to be displayed while the state of the optical path shifting element 100 is the transition state a and the image to be displayed while the state of the optical path shifting element 100 is the state A to the state D may be displayed. Further, the intermediate image may be generated by weighing each of the images to be displayed while the element is in each of the state A to the state D.

Although the operation performed while the state of the optical path shifting element 100 is the transition state a has been described above, the projector 1 performs similar operations while the state of the optical path shifting element 100 is one of the transition states b to d.

Thus, as an example, the image signal Dod for overdriving while the state of the optical path shifting element 100 is the transition state a may be given using the following formula [2] after setting the low-resolution image signal VIDL when the element is in the state A to a second image signal $V_A$, the low-resolution image signal VIDL when the element is in the state B to a first image signal VB, the low-resolution image signal VIDL when the element is in the state C to a first image signal $V_C$, the low-resolution image signal VIDL when the element is in the state D to a first image signal V D.

$$Dod = f_2(V_A, V_B, V_C, V_D) \quad [2]$$

Further, the function $f_2$ is determined to obtain a desired grayscale considering response characteristics of the liquid crystal, like the function $f_1$. This compensates for the response characteristics of the liquid crystal panel 10.

When the determination result by the image determination circuit 11A is a natural image, the voltage of the control signal CTL1_X increases from the lowest value to an intermediate value in the period from a timing t120 to a timing t121 as illustrated in FIG. 16. Furthermore, the voltage of the control signal CTL1_X is maintained at the intermediate value in the period from the timing t121 to a timing t122. Furthermore, the voltage of the control signal CTL1_X increases from the intermediate value to the highest value in the period from the timing t122 to a timing t123. Furthermore, the voltage of the control signal CTL1_X is maintained at the highest value in the period from the timing t123 to a timing t124. Furthermore, the voltage of the control signal CTL1_X decreases from the highest value to the intermediate value in the period from the timing t124 to a timing t125. Furthermore, the voltage of the control signal CTL1_X is maintained at the intermediate value in the period from the timing t125 to a timing t126 Furthermore, the voltage of the control signal CTL1_X increases from the intermediate value to the highest value in the period from the timing t126 to a timing t127. Furthermore, the voltage of the control signal CTL1_X is maintained at the highest value in the period from the timing t127 to a timing t128. Furthermore, the voltage of the control signal CTL1_X decreases from the highest value to the intermediate value in the period from the timing t128 to a timing t129. Furthermore, the voltage of the control signal CTL1_X is maintained at the intermediate value in the period from the timing t129 to a timing t130. Furthermore, the voltage of the control signal CTL1_X decreases from the intermediate value to the lowest value in the period from the timing t130 to a timing t131. Furthermore, the voltage of the control signal CTL1_X is maintained at the lowest value in the period from the timing t131 to a timing t136. Furthermore, the voltage of the control signal CTL1_X increases from the lowest value to the intermediate value in the period from the timing t136 to a timing t137.

Furthermore, the voltage of the control signal CTL1_Y increases from the lowest value to the intermediate value in the period from the timing t120 to the timing t121. Furthermore, the voltage of the control signal CTL1_Y is maintained at the intermediate value in the period from the timing t121 to the timing t122. Furthermore, the voltage of the control signal CTL1_Y decreases from the intermediate value to the lowest value in the period from the timing t122 to the timing t123. Furthermore, the voltage of the control signal CTL1_Y is maintained at the lowest value in the period from the timing t123 to the timing t124. Furthermore, the voltage of the control signal CTL1_Y increases from the lowest value to the intermediate value in the period from the timing t124 to the timing t125. Furthermore, the voltage of the control signal CTL1_Y is maintained at the intermediate value in the period from the timing t125 to the timing t126. Furthermore, the voltage of the control signal CTL1_Y increases from the intermediate value to the highest value in the period from the timing t126 to the timing t127. Furthermore, the voltage of the control signal CTL1_Y is maintained at the highest value in the period from the timing t127 to a timing t132. Furthermore, the voltage of the control signal CTL1_Y decreases from the highest value to the intermediate value in the period from the timing t132 to a timing t133. Furthermore, the voltage of the control signal CTL1_Y is maintained at the intermediate value in the period from the timing t133 to a timing t134. Furthermore, the voltage of the control signal CTL1_Y decreases from the intermediate value to the lowest value in the period from the timing t134 to a timing t135. Furthermore, the voltage of the control signal CTL1_Y is maintained at the lowest value in the period from the timing t135 to the timing t136. Furthermore, the voltage of the control signal CTL1_Y increases from the lowest value to the intermediate value in the period from the timing t136 to the timing t137.

Thus, the state of the optical path shifting element 100 starts to transition from the state A to the transition state a at the timing t120. Furthermore, the state of the optical path shifting element 100 ends the transition to the transition state a at the timing t121. Furthermore, the state of the optical path shifting element 100 is maintained in the transition state a in the period from the timing t121 to the timing t122. Also at the timing t122, the state of the optical path shifting element 100 starts to transition from the transition state a to the state B. In addition, the state of the optical path shifting element 100 ends the transition to the state B at the timing t123. Furthermore, the state of the optical path shifting element 100 is maintained in the state B in the period from the timing t123 to the timing t124. Also at the timing t124, the state of the optical path shifting element 100 starts to transition from the state B to the transition state b. Furthermore, the state of the optical path shifting element 100 ends the transition to the transition state b at the timing t125. Furthermore, the state of the optical path shifting element 100 is maintained in the transition state b in the period from the timing t125 to the timing t126. Also at the timing t126, the state of the optical path shifting element 100 starts to transition from the transition state b to the state C. In addition, the state of the optical path shifting element 100 ends the transition to the state C at the timing t127. Furthermore, the state of the optical path shifting element 100 is maintained in the state C in the period from the timing t127 to the timing t128. Also at the timing t128, the state of the optical path shifting element 100 starts to transition from the state C to the transition state c. Furthermore, the state of the optical path shifting element 100 ends the transition to the transition state c at the timing t129. Furthermore, the state of the optical path shifting element 100 is maintained in the transition state c in the period from the timing t129 to the timing t130. Also at the timing t130, the state of the optical path shifting element 100 starts to transition from the transition state c to the state D. In addition, the state of the optical path shifting element 100 ends the transition to the state D at the timing t131. Furthermore, the state of the optical path shifting element 100 is maintained in the state D in the period from the timing t131 to the timing t132. Also at the timing t132, the state of the optical path shifting element 100 starts to transition from the state D to the transition state d. In addition, the state of the optical path shifting element 100 ends the transition to the transition state d at the timing t133. Furthermore, the state of the optical path shifting element 100 is maintained in the transition state d in the period from the timing t133 to the timing t134. Also at the timing t134, the state of the optical path shifting element 100 starts to transition from the transition state d to the state A. In addition, the state of the optical path shifting element 100 ends the transition to the state A at the timing t135. Furthermore, the state of the optical path shifting element 100 is maintained in the state A in the period from the timing t135 to the timing t136. Also at the timing t136, the state of the optical path shifting element 100 starts to transition from the state A to the transition state a. Furthermore, the state of the optical path shifting element 100 ends the transition to the transition state a at the timing t137.

As described above, the state of the optical path shifting element 100 transitions from the state A to the state A again passing through the transition state a, the state B, the transition state b, the state C, the transition state c, the state D, and the transition state d.

In the embodiment, the projection position by the optical path shifting element 100 moves in a diagonal direction at all times. This makes it possible to lower the degree of display rattling when displaying diagonal lines as in the third embodiment.

Fifth Embodiment

Next, a drive method for the projector 1 according to a fifth embodiment of the present disclosure will be described with reference to FIGS. 17A and 17B. Hereinafter, a difference between the drive method for the projector 1 according to the fifth embodiment and the drive method for the projector 1 according to the first to fourth embodiments will be mainly described.

Figure 17A:
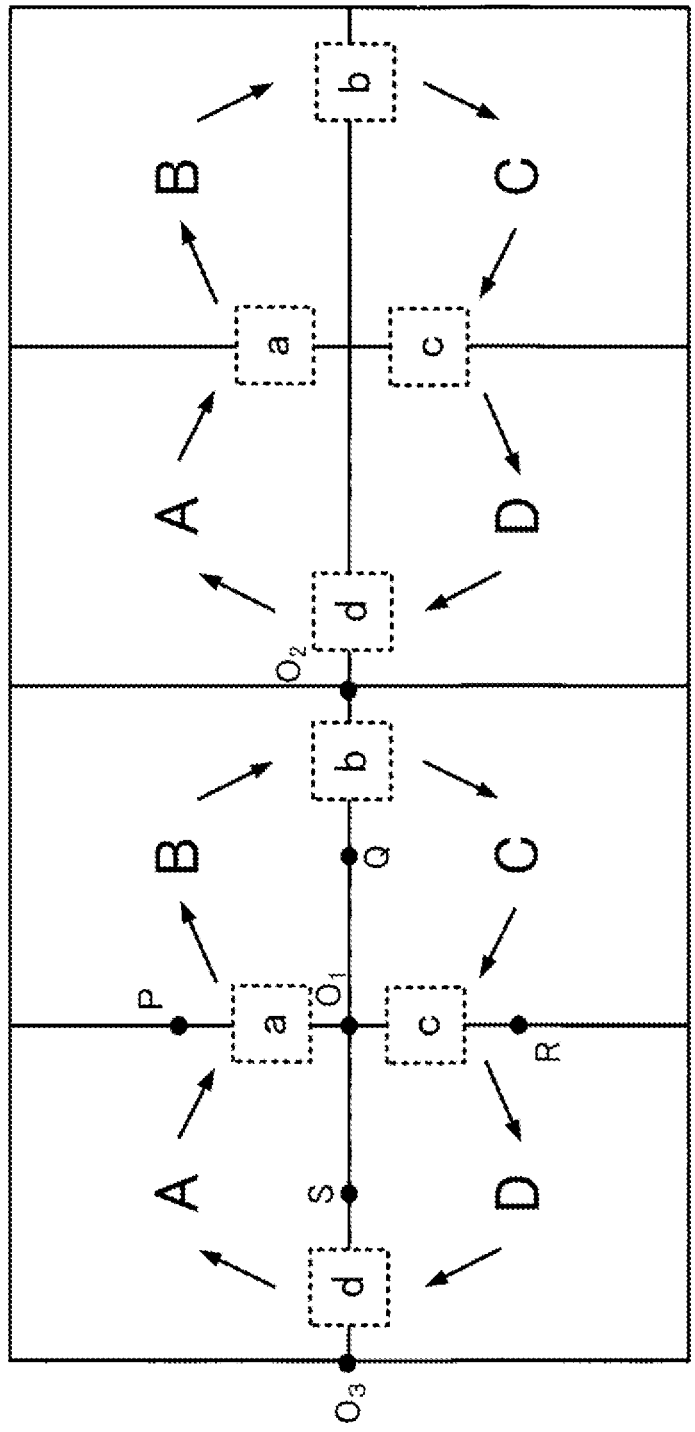
FIG. 17A is a descriptive diagram of projection positions of an optical path shifting element according to a fifth embodiment.
Figure 17B:
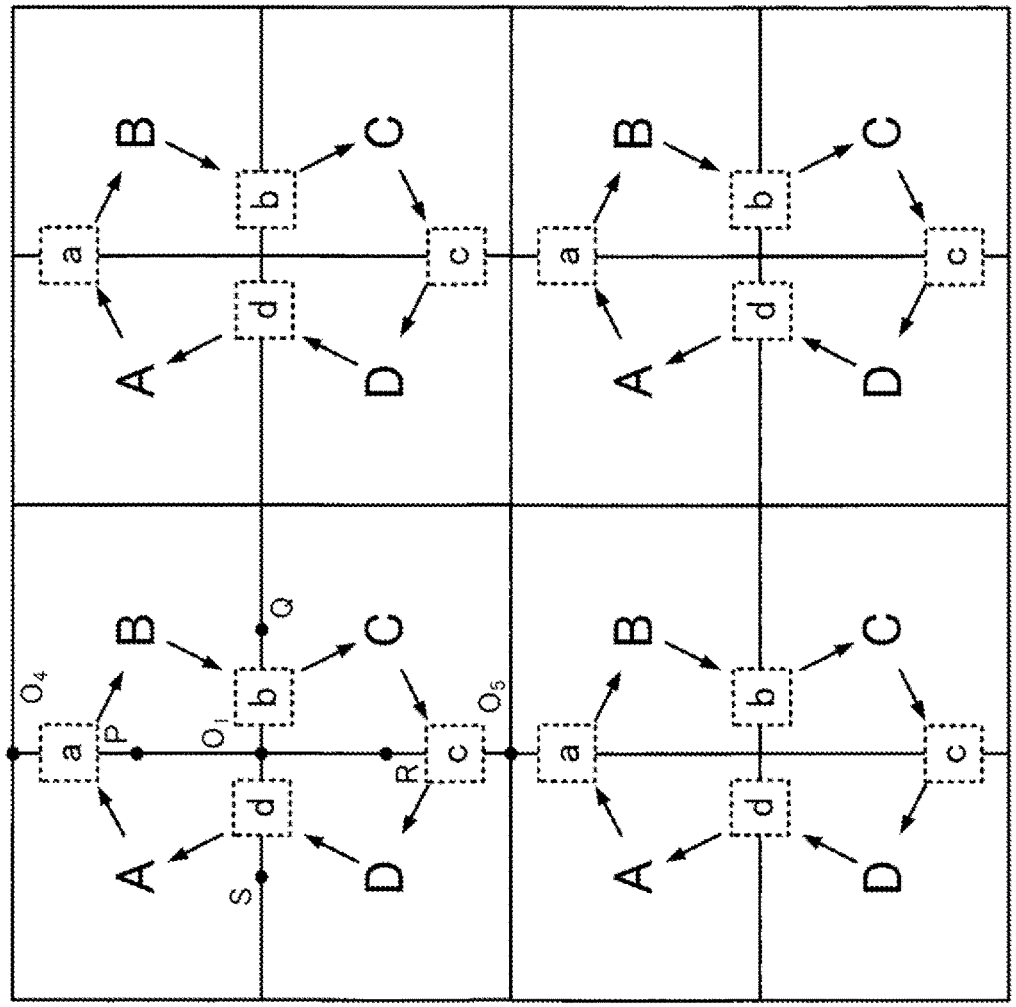
FIG. 17B is a descriptive diagram of projection positions of the optical path shifting element according to the fifth embodiment.

FIGS. 17A and 17B are diagrams illustrating states of the optical path shifting element 100, specifically, projection positions by the optical path shifting element 100. To be more specific, "A", "B", "C", and "D" on the left side in FIG. 17A correspond to "A1", "B1", "C1", and "D1" illustrated in FIG. 5, respectively, as an example. In addition, "A", "B", "C", and "D" on the right side in FIG. 17A correspond to "A2", "B2", "C2", and "D2" illustrated in FIG. respectively, as an example. In addition, "A", "B", "C", and "D" on the upper left side in FIG. 17B correspond to "A1", "B1", "C1", and "D1" illustrated in FIG. 5, respectively, as an example. In addition, "A", "B", "C", and "D" on the upper right side in FIG. 17B correspond to "A2", "B2", "C2", and "D2" illustrated in FIG. 5, respectively, as an example. In addition, "A", "B", "C", and "D" on the lower left side in FIG. 17B correspond to "A4", "B4", "C4", and "D4" illustrated in FIG. 5, respectively, as an example. In addition, "A", "B", "C", and "D" on the lower right side in FIG. 17B correspond to "A5", "B5", "C5", and "D5" illustrated in FIG. 5, respectively, as an example.

As illustrated in FIGS. 17A and 17B in the embodiment, when a natural image is to be displayed by the projector 1, the projection position when a state of the optical path shifting element 100 is a transition state is switched when an odd-numbered frame of a video is displayed and when an even-numbered frame of the video is displayed. Further, order in which the state of the optical path shifting element 100 transitions is the same when an odd-numbered frame of a video is displayed and when an even-numbered frame of the video is displayed. Specifically, the state of the optical path shifting element 100 transitions in order of the state A, the transition state a, the state B, the transition state b, the state C, the transition state c, the state D, the transition state d, the state A, and so on.

When an odd-numbered frame of a video is displayed, the projection position (a) by the optical path shifting element 100 while the state of the optical path shifting element 100 is the transition state a is a position between a midpoint P of the projection position (A) and the projection position (B) and the center O 1 of the square having four vertexes including the projection position (A), the projection position (B), the projection position (C), and the projection position (D) in order clockwise from the upper left side as illustrated in FIG. 17A. The projection position (b) by the optical path shifting element 100 while the state of the optical path shifting element 100 is in the transition state b is a position between a midpoint Q between the projection position (B) and the projection position (C) and the center O 2 of the square having the four vertexes including the projection position (B), the projection position (A), the projection position (D), and the projection position (C) in order clockwise from the upper left side. The projection position (c) by the optical path shifting element 100 while the state of the optical path shifting element 100 is the transition state c is a position between a midpoint R of the projection position (C) and the projection position (D) and the center O 1 of the square. The projection position (d) by the optical path shifting element 100 while the state of the optical path shifting element 100 is in the transition state d is a position between a midpoint S between the projection position (D) and the projection position (A) and the center O 3 of the square having the four vertexes including the projection position (B), the projection position (A), the projection position (D), and the projection position (C) in order clockwise from the upper left side. That is, when the odd-numbered frame of the video is displayed, a trajectory is drawn on the projection positions in the form of a lying number 8.

On the other hand, when an even-numbered frame of a video is displayed, the projection position (a) by the optical path shifting element 100 while the state of the optical path shifting element 100 is the transition state a is a position between a midpoint P of the projection position (A) and the projection position (B) and the center 4 of the square having four vertexes including the projection position (D), the projection position (C), the projection position (B), and the projection position (A) in order clockwise from the upper left side as illustrated in FIG. 17B. The projection position (b) by the optical path shifting element 100 while the state of the optical path shifting element 100 is the transition state b is a position between a midpoint Q of the projection position (B) and the projection position (C) and the center O 1 of the square. The projection position (c) by the optical path shifting element 100 while the state of the optical path shifting element 100 is the transition state c is a position between a midpoint R between the projection position (C) and the projection position (D) and the center O 5 of the square having the four vertexes including the projection position (D), the projection position (C), the projection position (B), and the projection position (A) in order clockwise from the upper left side. The projection position (d) by the optical path shifting element 100 while the state of the optical path shifting element 100 is the transition state d is a position between a midpoint S of the projection position (D) and the projection position (A) and the center O 1 of the square. That is, when the odd-numbered frame of the video is displayed, a trajectory is drawn on the projection positions in the form of standing number 8.

In the embodiment, the projection position of the optical path shifting element 100 moves in the diagonal direction at all times, as in the fourth embodiment. This makes it possible to eliminate display rattling when displaying diagonal lines, as in the third and fourth embodiments.

In addition, in the embodiment, the trajectory of the projection positions switches to the trajectory in the form of a lying number 8 or the trajectory in the form of a standing number 8 depending on whether the video to be displayed is of an odd-numbered frame or an even-numbered frame. The reason for this is that asymmetry occurs in the moving direction when the trajectory of the projection positions is only set to the trajectory in the form of a lying number 8 or when the trajectory thereof is only set to the trajectory in the form of a standing number 8. As a result, by generating the trajectory in the form of a lying number 8 and the trajectory in the form of a standing number 8 as the trajectory of the projection positions in a well-balanced manner, symmetry in the movement direction can be maintained. In addition, the trajectory of the projection positions is averaged, and dot display becomes smoother.

Sixth Embodiment

Next, a drive method for a projector 1 according to a sixth embodiment of the present disclosure will be described with reference to FIG. 18. Hereinafter, a difference between an operation of the projector 1 according to the sixth embodiment and the operation of the projector 1 according to the first to fifth embodiments will be mainly described.

Figure 18:
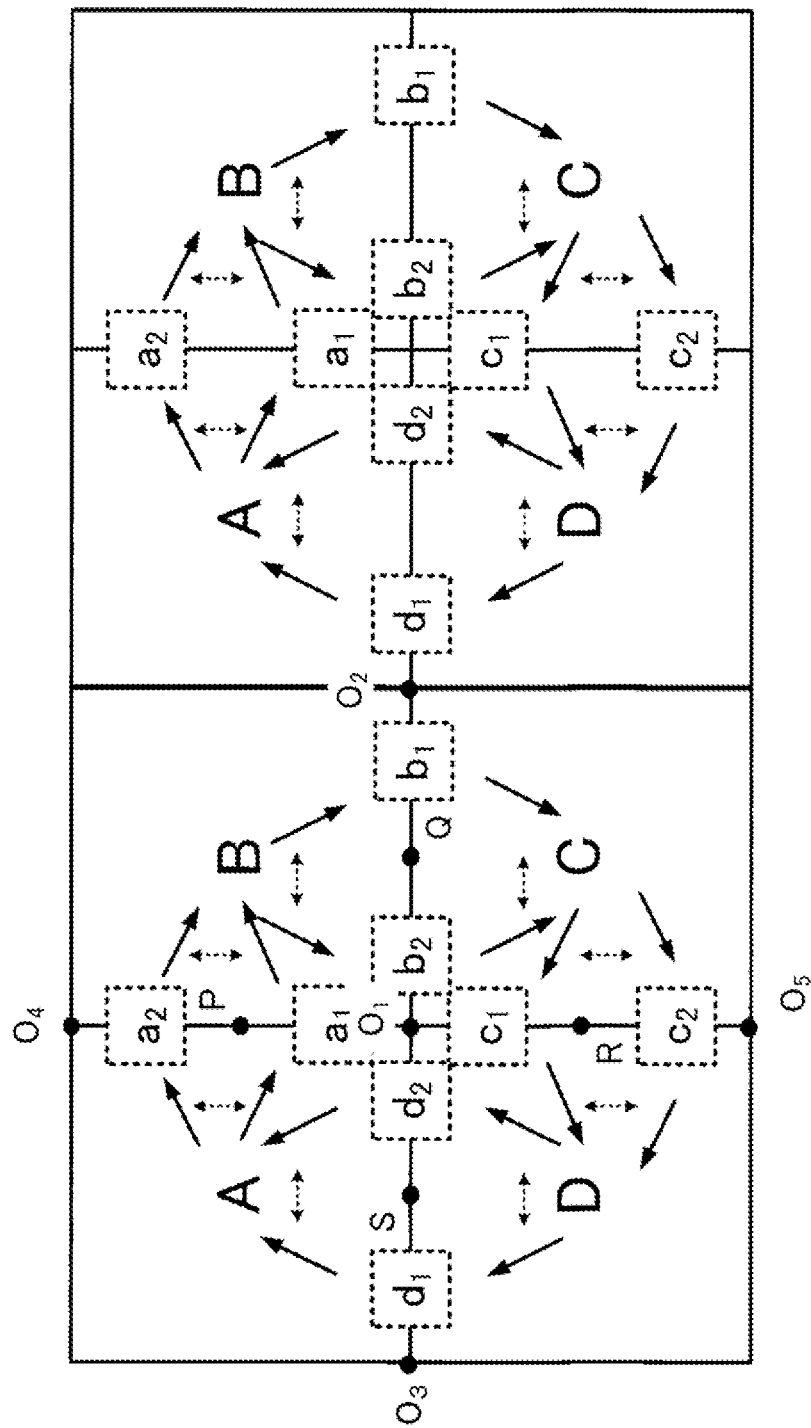
FIG. 18 is a descriptive diagram of projection positions of an optical path shifting element according to a sixth embodiment.

FIG. 18 is a diagram illustrating states of an optical path shifting element 100, specifically, projection positions by the optical path shifting element 100. To be more specific, "A", "B", "C", and "D" on the left side in FIG. 18 correspond to "A1", "B1", "C1", and "D1" illustrated in FIG. 5, respectively, as an example. In addition, "A", "B", "C", and "D" on the right side in FIG. 18 correspond to "A2", "B2", "C2", and "D2" illustrated in FIG. 5, respectively, as an example.

When a natural image is displayed by the projector 1 in the embodiment, a projection position while the state of the optical path shifting element 100 is a transition state is switched as illustrated in FIG. 18 according to the time that has elapsed after the projector 1 started image display.

Specifically, in the embodiment, a state of the optical path shifting element 100 transitions to the state A, a transition state $a_1$, the state B, a transition state $b_1$, the state C, a transition state $c_1$, the state D, a transition state $d_1$, the state A, a transition State $a_2$, the state B, a transition state $b_2$, the state C, a transition state $c_2$, the state D, a transition state $d_2$, the state A, and the like in order. Hereinafter, a period in which a state of the optical path shifting element 100 transitions to the state A, the transition state $a_1$, the state B, the transition state $b_1$, the state C, the transition state $c_1$, the state D, and the transition state d 1 in order will be referred to as a first subframe period. In addition, a period in which a state of the optical path shifting element 100 transitions to the state A, the transition state $a_2$, the state B, the transition state $b_2$, the state C, the transition state $c_2$, the state D, and the transition state d 2 in order will be referred to as a second subframe period below.

Further, one frame period may be constituted by the first subframe period and the second subframe period described above, or one frame period may be only the first subframe period described above, or only the second subframe period described above.

In addition, a projection position ($a_1$) by the optical path shifting element 100 while a state of the optical path shifting element 100 is the transition state $a_1$ is a position between a midpoint P of the projection position (A) and the projection position (B) and the center $O_1$ of the square having the four vertexes including the projection position (A), the projection position (B), the projection position (C), and the projection position (D) in order clockwise from the upper left side. Meanwhile, a projection position (a 2) by the optical path shifting element 100 while a state of the optical path shifting element 100 is the transition state a 2 is a position between the midpoint P of the projection position (A) and the projection position (B) and the center O 4 of the square having the four vertexes including the projection position (D), the projection position (C), the projection position (B), and the projection position (A) in order clockwise from the upper left side.

Likewise, a projection position ($b_1$) by the optical path shifting element 100 while the state of the optical path shifting element 100 is in the transition state $b_1$ is a position between a midpoint Q between the projection position (B) and the projection position (C) and the center $O_2$ of the square having the four vertexes including the projection position (B), the projection position (A), the projection position (D), and the projection position (C) in order clockwise from the upper left side. Meanwhile, a projection position ($b_2$) by the optical path shifting element 100 while a state of the optical path shifting element 100 is the transition state $b_2$ is a position between the midpoint Q of the projection position (B) and the projection position (C) and the center $O_1$ of the square having the four vertexes including the projection position (A), the projection position (B), the projection position (C), and the projection position (D) in order clockwise from the upper left side.

Likewise, a projection position ($c_1$) by the optical path shifting element 100 while a state of the optical path shifting element 100 is the transition state $c_1$ is a position between a midpoint R of the projection position (C) and the projection position (D) and the center $O_1$ of the square having the four vertexes including the projection position (A), the projection position (B), the projection position (C), and the projection position (D) in order clockwise from the upper left side. Meanwhile, a projection position ($c_2$) by the optical path shifting element 100 while a state of the optical path shifting element 100 is the transition state $c_2$ is a position between the midpoint R between the projection position (C) and the projection position (D) and the center $O_5$ of the square having the four vertexes including the projection position (D), the projection position (C), the projection position (B), and the projection position (A) in order clockwise from the upper left side.

Likewise, a projection position ($d_1$) by the optical path shifting element 100 while a state of the optical path shifting element 100 is a transition state $d_1$ is a position between a midpoint S between the projection position (D) and the projection position (A) and the center $O_3$ of the square having the four vertexes including the projection position (B), the projection position (A), the projection position (D), and the projection position (C) in order clockwise from the upper left side. Meanwhile, a projection position ($d_2$) by the optical path shifting element 100 while a state of the optical path shifting element 100 is the transition state $d_2$ is a position between the midpoint S of the projection position (D) and the projection position (A) and the center $O_1$ of the square having the four vertexes including the projection position (A), the projection position (B), the projection position (C), and the projection position (D) in order clockwise from the upper left side.

Further, in each of the transition states a to d, the projection position in the first subframe period and the projection position in the second subframe period may be switched therebetween. For example, while the projection position by the optical path shifting element 100 while the element is in the transition state a may be the position $a_2$ in FIG. 18 in the first subframe period, and may be the position $a_1$ in FIG. 18 in the second subframe period.

As an example, the projection position by the optical path shifting element 100 may draw, in the first subframe period, the same trajectory as that when an odd-numbered frame of a video is displayed in the fifth embodiment, and may draw, in the second subframe period, the same trajectory as that when an even-numbered frame of a video is displayed in the fifth embodiment.

In the embodiment, the projection position by the optical path shifting element 100 moves in the diagonal direction at all times, as in the fourth and fifth embodiments. This makes it possible to lower the degree of display rattling when displaying diagonal lines as in the third to fifth embodiments.

In addition, in the embodiment, the trajectory of the projection positions by the optical path shifting element 100 is switched according to the time that has elapsed after the projector 1 started image display. Thus, the projection positions are averaged, and dot display becomes smoother.

Seventh Embodiment

Next, a drive method for a projector 1 according to a seventh embodiment of the present disclosure will be described with reference to FIG. 19. Hereinafter, a difference between the drive method for the projector 1 according to the seventh embodiment and the drive method for the projector 1 according to the first to sixth embodiments will be mainly described.

Figure 19:
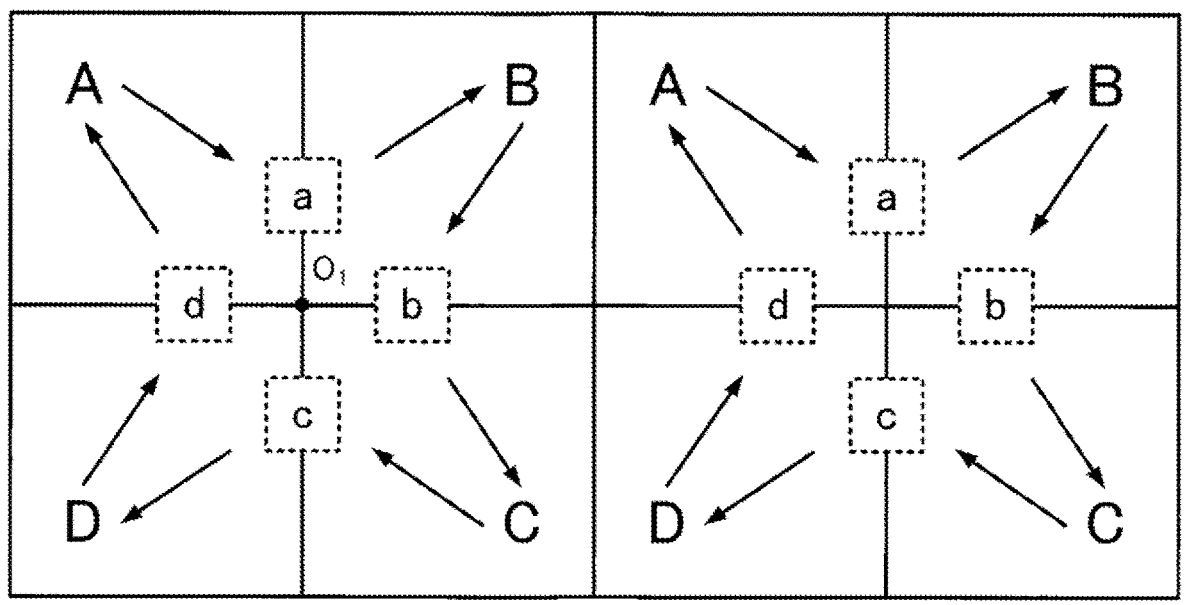
FIG. 19 is a descriptive diagram of projection positions of an optical path shifting element according to a seventh embodiment.

FIG. 19 is a diagram illustrating states of an optical path shifting element 100, specifically, projection positions by the optical path shifting element 100. To be more specific, "A", "B", "C", and "D" on the left side in FIG. 19 correspond to "A1", "B1", "C1", and "D1" illustrated in FIG. 5, respectively, as an example. In addition, "A", "B", "C", and "D" on the right side in FIG. 19 correspond to "A2", "B2", "C2", and "D2" illustrated in FIG. 5, respectively, as an example.

Comparing a projection position by the optical path shifting element 100 according to the embodiment to the projection position of the optical path shifting element 100 according to the second embodiment illustrated in FIG. 10, all of the projection position (A) to the projection position (D) move away from the center $O_1$ of the square having the four vertexes including the projection position (A) to the projection position (D) of the second embodiment. More particularly, the projection position (A) has moved from the center $O_1$ of the square to the upper left. The projection position (B) has moved from the center $O_1$ of the square to the upper right. The projection position (C) has moved from the center $O_1$ of the square to the lower left. The projection position (D) has moved from the center $O_1$ of the square to the lower left.

In the embodiment, by moving the projection position (A) to the projection position (D) away from the center $O_1$ of the square, the projection positions by the optical path shifting element 100 move in diagonal directions at all times, as in the fourth to sixth embodiments. This makes it possible to lower the degree of display rattling when displaying diagonal lines as in the third to sixth embodiments. Further, although the projection positions (A) to (D) in the embodiment are assumed to move away from the center $O_1$ of the square in the above description, compared to the projection positions (A) to (D) by the optical path shifting element 100 according to the second embodiment, an aspect of the embodiment is not limited thereto. For example, in the embodiment, the projection positions (A) to (D) may move away from the center O or any one of the centers $O_1$ to $O_5$ of the square, compared to the projection positions (A) to (D) by the optical path shifting element 100 according to the third to sixth embodiments.

MODIFICATION EXAMPLE

The disclosure is not limited to the embodiments illustrated above. Specific modification modes are exemplified below. Two or more modes freely selected from the examples described below may be combined.

Modification Example 1

Each of the projectors 1 according to the first to seventh embodiments described above includes, for example, the optical path shifting element 100 and the optical path shifting element drive circuit 12. However, the embodiments of the present disclosure are not limited thereto. For example, the embodiments of the present disclosure may include a digital micro-mirror device (DMD) and a drive circuit thereof in place of the optical path shifting element 100 and the optical path shifting element drive circuit 12.

Modification Example 2

In the first to seventh embodiments described above, for example, VA liquid crystals are provided between the pixel electrodes and the counter electrodes. However, the embodiments of the present disclosure are not limited thereto. For example, another reflective liquid crystal, or TN or IPS liquid crystals may be provided between the pixel electrodes and the counter electrodes.

Modification Example 3

In the first to seventh embodiments described above, the timing control circuit 13 time-divides a single frame period corresponding to one frame into unit periods each corresponding to a state of the optical path shifting element 100. However, the embodiments of the present disclosure are not limited thereto. For example, the constituent elements of the projector 1 to 1F, most of all, the constituent elements constituting the control system of the projectors 1, may cooperate with each other to time-divide a single frame period corresponding to one frame into unit periods each corresponding to a state of the optical path shifting element 100.

Modification Example 4

When an odd-numbered frame of a video is displayed in the third embodiment described above, the projection position by the optical path shifting element 100 moves in a combined direction of the horizontal direction and the diagonal direction. On the other hand, when an even-numbered frame of a video is displayed, the projection position by the optical path shifting element 100 moves in a combined direction of the vertical direction and the diagonal direction. However, the embodiment of the present disclosure is not limited thereto. For example, regardless of whether an odd-numbered frame of a video is displayed or an even-numbered frame of a video is displayed, the projection position by the optical path shifting element 100 may move in a combined direction of the horizontal direction and the diagonal direction. For example, regardless of whether an odd-numbered frame of a video is displayed or an even-numbered frame of a video is displayed, the projection position by the optical path shifting element 100 may move in a combined direction of the vertical direction and the diagonal direction.

What is claimed is:

1. A projector comprising:
an electro-optical panel in which a plurality of pixels are arrayed;
an optical path shifting element configured to change an optical path of light emitted from the plurality of pixels;
an image processing circuit configured to supply a first image signal based on an input image signal to the electro-optical panel in a first unit period among a plurality of unit periods included in one frame period and supply a second image signal based on the input image signal to the electro-optical panel in a second unit period after the first unit period among the plurality of unit periods; and
a control circuit configured to control a state of the optical path shifting element such that light emitted from a predetermined pixel among the plurality of pixels reaches a first position on a display screen in the first unit period, control a state of the optical path shifting element such that light emitted from the predetermined pixel reaches a second position on the display screen in the second unit period, and control, based on a type of image indicated by the input image signal, a state of the optical path shifting element in a transition period in which a unit period transitions from the first unit period to the second unit period, wherein the control circuit controls a state of the optical path shifting element such that light emitted from the predetermined pixel reaches a third position on the display screen in the transition period, and
the image processing circuit generates a third image signal to be supplied to the electro-optical panel based on the first image signal and the second image signal in the transition period.

2. The projector according to claim 1, wherein
the control circuit controls, based on the type of the image, at least one of a speed of change and an amount of change of the state of the optical path shifting element in the transition period.

3. The projector according to claim 1, wherein
the image processing circuit includes an overdrive processing circuit configured to perform overdrive processing to determine a compensation amount for compensating response characteristics of the electro-optical panel based on a grayscale indicated by the first image signal and a grayscale indicated by the second image signal, and
the overdrive processing circuit adjusts the compensation amount determined in the overdrive processing based on the type of the image.

4. The projector according to claim 1, wherein
the third position is an intermediate position between the first position and the second position.

5. The projector according to claim 4, wherein
the image processing circuit supplies a third image signal based on the input image signal to the electro-optical panel as the image signal in a third unit period after the second unit period among the plurality of unit periods included in one frame period, and supplies a fourth image signal based on the input image signal to the electro-optical panel as the image signal in a fourth unit period after the third unit period among the plurality of unit periods,
the control circuit controls a state of the optical path shifting element such that light emitted from the predetermined pixel among the plurality of pixels reaches a fourth position on the display screen in the third unit period, controls a state of the optical path shifting element such that light emitted from the predetermined pixel reaches a fifth position on the display screen in the fourth unit period, and controls a state of the optical path shifting element such that light emitted from the predetermined pixel reaches the third position on the display screen in a transition period in which the unit period transitions from the third unit period to the fourth unit period, and
the third position is an intermediate position between the fourth position and the fifth position.

6. The projector according to claim 5, wherein
the first position and the second position are positioned in a first diagonal direction with respect to a direction in which the plurality of pixels are arrayed, and the fourth position and the fifth position are in a second diagonal direction with respect to the direction in which the plurality of pixels are arrayed, the second diagonal direction being a direction orthogonal to the first diagonal direction.

7. A projector comprising:
an electro-optical panel in which a plurality of pixels are arrayed;
an optical path shifting element configured to change an optical path of light emitted from the plurality of pixels;

an image processing circuit configured to supply a first image signal based on an input image signal to the electro-optical panel in a first unit period among a plurality of unit periods included in one frame period and supply a second image signal based on the input image signal to the electro-optical panel in a second unit period after the first unit period among the plurality of unit periods; and a control circuit configured to control a state of the optical path shifting element such that light emitted from a predetermined pixel among the plurality of pixels reaches a first position on a display screen in the first unit period, control a state of the optical path shifting element such that light emitted from the predetermined pixel reaches a second position on the display screen in the second unit period, and control, based on a type of image indicated by the input image signal, a state of the optical path shifting element in a transition period in which a unit period transitions from the first unit period to the second unit period, wherein the control circuit controls a state of the optical path shifting element such that light emitted from the predetermined pixel reaches a third position on the display screen in the transition period, and the third position is deviated from an intermediate position between the first position and the second position.

8. The projector according to claim 7, wherein the control circuit switches a direction in which a position of light emitted from a predetermined pixel of the plurality of pixels transitions from the first position to the third position on the display screen and a direction in which a position of the light transitions from the third position to the second position based on whether the one frame period is a frame period of an odd-numbered frame or a frame period of an even-numbered frame.

9. The projector according to claim 8, wherein a subframe period including the first unit period, the transition period, and the second unit period is repeated at least twice in the one frame period, and a position that the light emitted from the predetermined pixel reaches on the display screen differs in the transition period in an odd-numbered subframe period of the one frame period.

10. The projector according to claim 1, wherein the control circuit causes a transition between the first position and the second position based on the type of the image indicated by the input image signal.

11. A projector comprising:

an electro-optical panel in which a plurality of pixels are arrayed;

an optical path shifting element configured to change an optical path of light emitted from the plurality of pixels;

an image processing circuit configured to supply a first image signal based on an input image signal to the electro-optical panel in a first unit period among a plurality of unit periods included in one frame period and supply a second image signal based on the input image signal to the electro-optical panel in a second unit period after the first unit period among the plurality of unit periods; and a control circuit configured to control a state of the optical path shifting element such that light emitted from a predetermined pixel among the plurality of pixels reaches a first position on a display screen in the first unit period, control a state of the optical path shifting element such that light emitted from the predetermined pixel reaches a second position on the display screen in the second unit period, and control, based on a type of image indicated by the input image signal, a state of the optical path shifting element in a transition period in which a unit period transitions from the first unit period to the second unit period, wherein the image processing circuit identifies the type of the image using a value of difference in luminance between adjacent pixels and outputs type information indicating the identification result to the control circuit.

* * * * *